United States Patent
Saitoh

[19]

[11] Patent Number: 5,992,232
[45] Date of Patent: Nov. 30, 1999

[54] DYNAMIC BALANCE ADJUSTING APPARATUS

[75] Inventor: Noboru Saitoh, Tokyo, Japan

[73] Assignee: Asahi Kogaku Kogyo Kabushiki Kaisha, Tokyo, Japan

[21] Appl. No.: 08/861,035

[22] Filed: May 21, 1997

[30] Foreign Application Priority Data

| May 22, 1996 | [JP] | Japan | 8-126943 |
| May 22, 1996 | [JP] | Japan | 8-127073 |
| May 28, 1996 | [JP] | Japan | 8-132928 |
| May 28, 1996 | [JP] | Japan | 8-132942 |
| May 28, 1996 | [JP] | Japan | 8-132983 |

[51] Int. Cl.⁶ ................................................. G01M 1/16
[52] U.S. Cl. ............................................ 73/468; 29/901
[58] Field of Search ........................ 73/468, 462, 460, 73/66; 408/2, 10, 12, 13, 43, 44, 71; 29/901

[56] References Cited

U.S. PATENT DOCUMENTS

| 3,934,963 | 1/1976 | Langlois | 408/2 |
| 5,199,992 | 4/1993 | Hines et al. | 73/462 |
| 5,505,083 | 4/1996 | Hines et al. | 73/462 |
| 5,680,694 | 10/1997 | Best | 29/701 |
| 5,709,303 | 1/1998 | Best | 206/459.1 |

*Primary Examiner*—Richard A. Moller
*Attorney, Agent, or Firm*—Greenblum & Bernstein, P.L.C.

[57] ABSTRACT

An automatic dynamic balance adjusting apparatus is provided that adjusts the dynamic balance of a rotating body on a workpiece. The dynamic balance adjusting apparatus includes a control unit, a turntable for carrying the workpiece along a predetermined path, and a plurality of stations, arranged along the path, at which processes are performed on the workpiece. The stations include a measurement station at which the dynamic balance of the rotating body is determined, a dispenser station at which the application of a balance-weight agent is performed to adjust the dynamic balance of the rotating body, and an inspection station at which the dynamic balance of the rotating body is checked. In particular, the dynamic balance of the rotating body may be measured and checked after the rotating body has been mounted on a sub-assembly or the like by utilizing a holder, on which the workpiece is securely mounted, that is resiliently supported on the turntable and is provided with at least one acceleration sensor to provide data used in determining the dynamic balance of the rotating body.

57 Claims, 31 Drawing Sheets

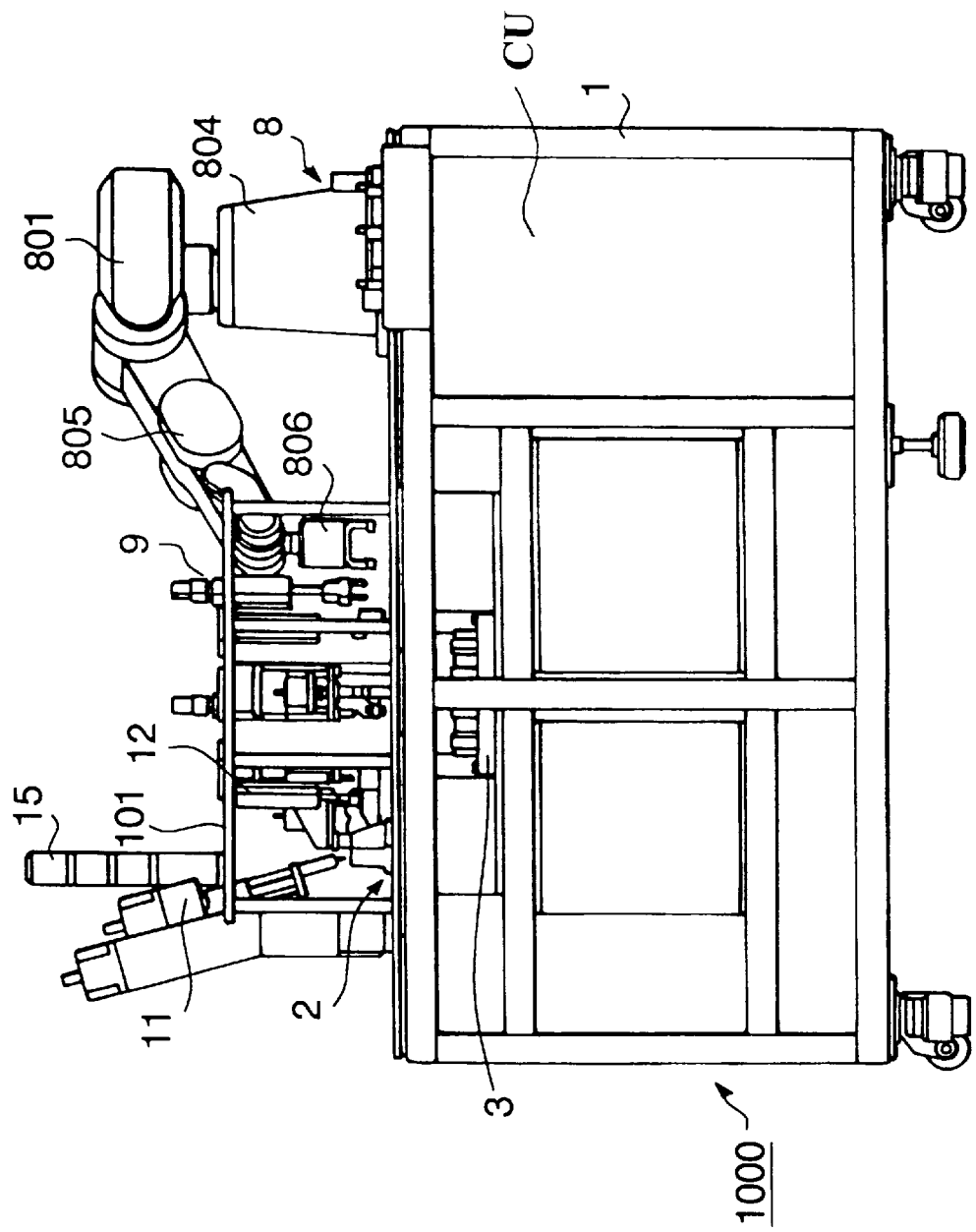

DYNAMIC BALANCE ADJUSTING APPARATUS

BACKGROUND OF THE INVENTION

The present invention is related to a dynamic balance adjusting apparatus for completely balancing a rotating body on a sub-assembly or finished device (such as a polygon mirror on a polygon mirror sub-assembly) in order to minimize vibration.

The dynamic balance of a rotating body is adjusted by (1) measuring a dynamic balance of the rotating body and (2) applying balance-weights on the rotating body according to the measurement. Generally, the balance-weight agent (a solid or a liquid) is manually applied on the rotating body. However, with manual application, the correct amount of the balance-weight agent may not be applied on the correct position of the rotating body. Further, a manual process is often slow and difficult to incorporate into a manufacturing line.

Furthermore, in order to adjust a dynamic balance of a rotating body which is already mounted to a sub-assembly or a finished device (such as a polygon mirror mounted on a polygon mirror sub-assembly), there are several problems. For example, if the rotating body is already mounted, it is difficult to measure the dynamic balance of the rotating body since sensors cannot be as easily mounted on the rotating body. Also, since the rotating body is already mounted, a rotation shaft of the rotating body does not generally protrude enough to be gripped to provide rotation during the adjustment process.

SUMMARY OF THE INVENTION

It is therefore an object of the present invention to provide an automatic dynamic balance adjusting apparatus capable of precise adjustment of a rotating body even if the rotating body is part of a sub-assembly or finished device.

According to one aspect of the invention, there is provided a dynamic balance adjusting apparatus for adjusting a dynamic balance of a rotating member on a workpiece. The apparatus includes: a control unit, a turntable for carrying a workpiece thereon, the turntable controlled by the control unit to rotate in a predetermined path; and a plurality of stations (controlled by the control unit) arranged along the predetermined path. The plurality of stations include a mounting station for mounting the workpiece on the turntable, a measuring station for measuring a dynamic balance of the rotating body, an applying station for applying a balance-weight agent on the rotating body according to the measurement of the measuring station; and a discharge station for discharging the workpiece from the turntable.

This arrangement provides an automatic apparatus for dynamic balance adjustment since each station is controlled by the control unit.

In a preferred embodiment, the turntable is provided with a plurality of holders, arranged along the circular path, each holder holding one workpiece thereon. In particular, each of the plurality of holders is provided with at least one acceleration sensor for measuring a vibration caused by a rotation of the rotating body and the turntable is provided with resilient support members which support the plurality of holders. By connecting the control unit to the acceleration sensor, the dynamic balance can be measured.

Since the holder is held by the resilient member on the turntable, the vibration caused by the rotation of the rotating body also vibrates the holder. That is, by measuring the acceleration on the holder, it is possible to measure a dynamic balance of a rotating body which has already been mounted to a workpiece.

In one particular case, each of the plurality of holders further includes a receptacle electrically connected to the at least one acceleration sensor and the measuring station includes a connecting mechanism which is connectable to the receptacle such that the measuring station is electrically connected to the acceleration sensor when the holder is positioned at the measuring station. The connecting mechanism may include a plug and a plug carrier for plugging the plug into the receptacle. Thus, even though the acceleration sensor is provided to each holder, the measuring station may be connected to each acceleration sensor when measuring the dynamic balance.

In another preferred embodiment, the measuring station includes a second connecting mechanism for connecting the control unit and a receptacle formed on the workpiece so that the control unit is able to drive the workpiece. In this case, the second connecting mechanism includes a connector unit electrically connected to the control unit and a manipulator which holds the connector unit, the manipulator being arranged to mount the connector unit on the receptacle of the workpiece and to retract the connector unit from the receptacle, as required. With this arrangement, it is possible to rotate a rotating body that has already been mounted to a workpiece by sending a drive current to the workpiece. Thus, it is possible to measure a dynamic balance of the rotating body which has already been mounted to a workpiece. Further, because the second connecting mechanism is not connected to the workpiece during measuring, that is, only the connector unit is connected by flexible wires to the control unit, the second connecting mechanism does not interfere with the measurement.

In another particular arrangement, at least one elevator mechanism is provided for lifting the holder slightly away from the turntable and for supporting the holder at a lifted position. In particular, the elevator mechanism is located at the applying station such that the holder (and therefore the workpiece) may be supported without resilience when applying the balance-weight agent.

In another particular arrangement, the holder is further provided with a magnetic arrangement for attaching the workpiece on the holder. Thus, the mounting and positioning of the workpiece on the holder is made easier.

Preferably, the applying station includes a precise positioning mechanism for positioning the rotating body with respect to said applying station, such that the positioning of the balance-weight agent is very precise. The applying arrangement also includes a dispenser for dispensing the balance-weight agent on the rotating body and, if necessary, a fixing device for hardening the dispensed balance-weight agent to fix the balance-weight agent onto the rotating body.

BRIEF DESCRIPTION OF THE DRAWINGS

FIG. 2 is a front view of a dynamic balance adjusting apparatus;

DESCRIPTION OF THE PREFERRED EMBODIMENT

The embodiment of the present invention is described with reference to the accompanying drawings. A dynamic balance adjusting apparatus of the embodiment is arranged to adjust the dynamic balance of a polygon mirror mounted in a polygon mirror sub-assembly for a laser scanning system.

Workpiece (Polygon Mirror Sub-assembly)

Figure 1A:
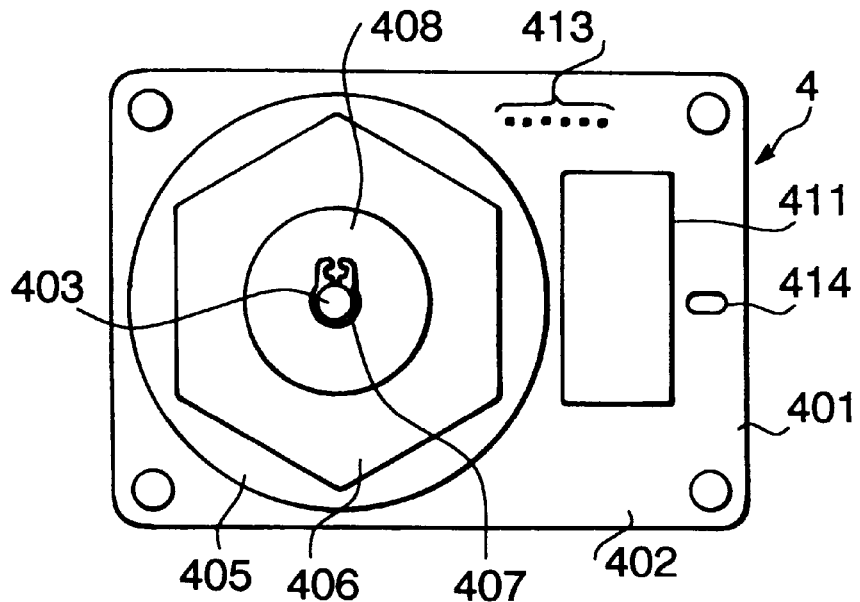
FIGS. 1A and 1B are a plan view and a sectional view of a polygon mirror sub-assembly.
Figure 1B:
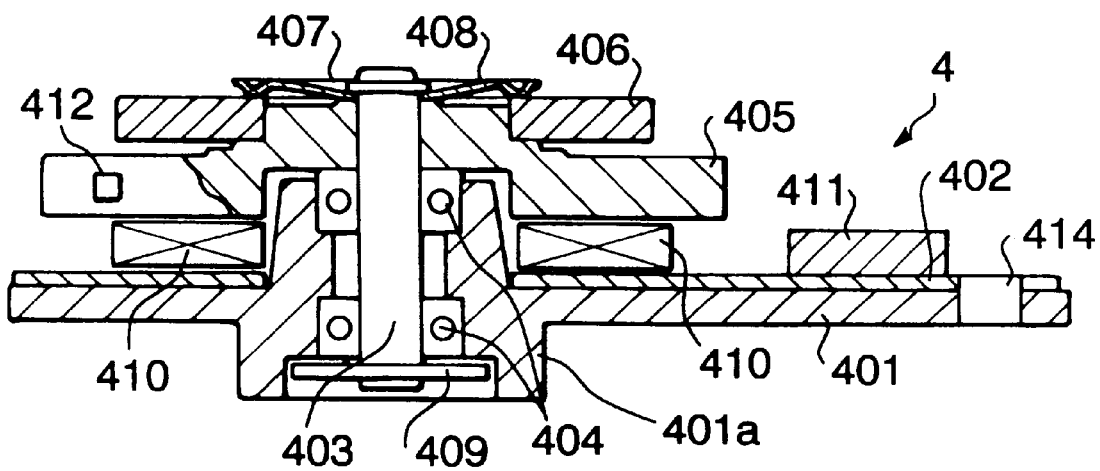
Figure 3:
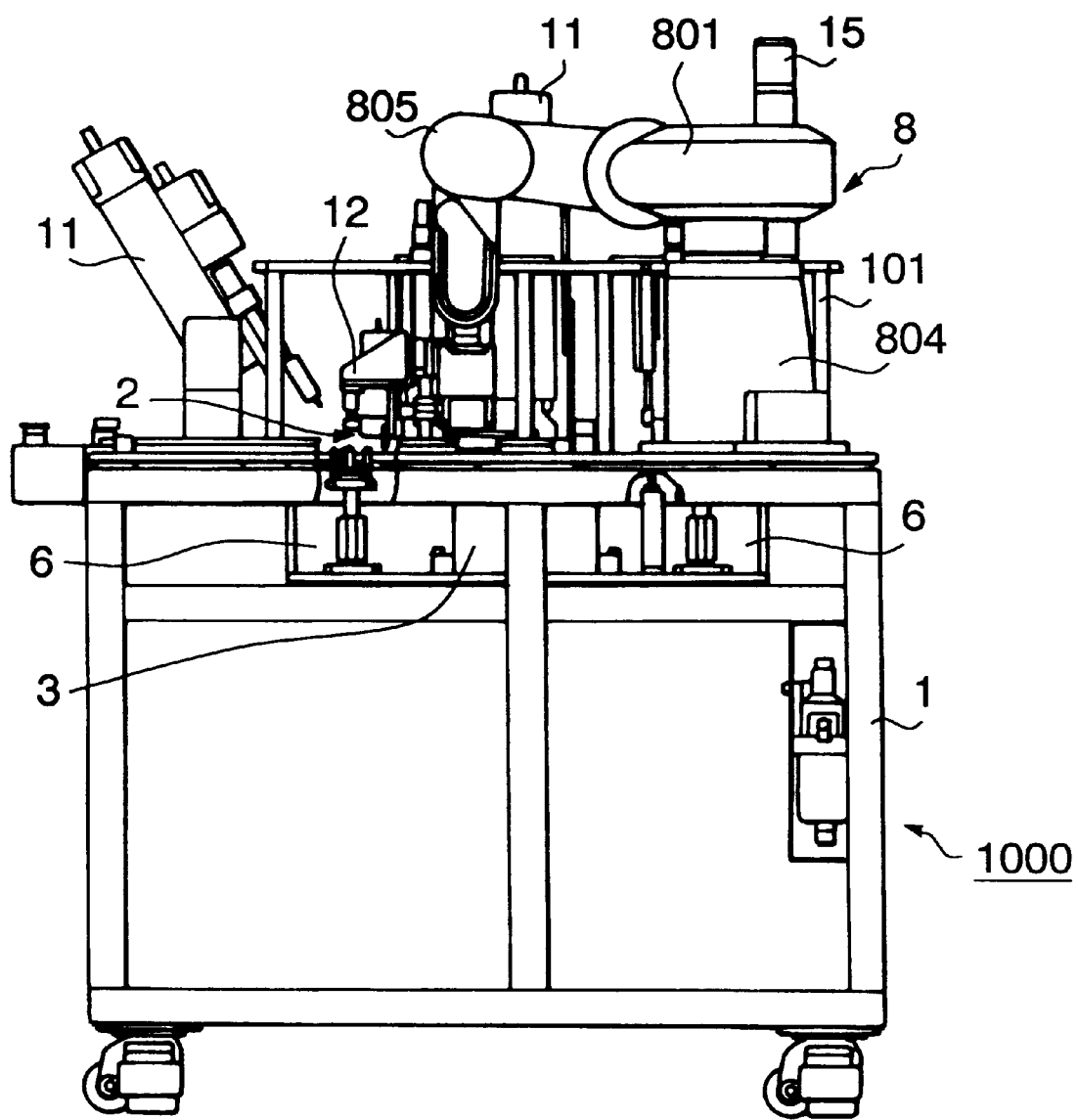
FIG. 3 is a side view of a dynamic balance adjusting apparatus of FIG. 2.

FIGS. 1A and 1B are a plan view and a sectional view of the polygon mirror sub-assembly 4. The polygon mirror sub-assembly 4 includes the polygon mirror 406, the rotor 405, a rotation shaft 403, and the base plate 401. The base plate 401 is provided with a bracket 401a, in which the rotation shaft 403 is vertically and rotatably supported by bearings 404. The polygon mirror 406 and the rotor 405 are provided at a top end of the rotation shaft 403, in the view of FIGS. 1A and 1B. The bracket 401a extends under the base plate 401 to cover a bottom end of the rotation shaft 403.

A circuit board 402 is provided on the base plate 401. A coil 410 is provided on the circuit board 402 facing the bottom of the rotor 405 so that the coil 410 and the rotor 405 form a motor. The circuit board 402 is provided with an integrated circuit 411, which includes circuitry for controlling the current flowing in the coil 410 in order to rotate the rotor 405 (and, correspondingly, rotate the rotation shaft 403 and the polygon mirror 406). The circuit board 402 is further provided with a receptacle 413 connected to the integrated circuit 411. Still further, the base plate 401 is provided with a positioning hole 414 to which a positioning pin 506 (described below) may be engaged.

A plate spring 408 is fixed to the top end of the rotation shaft 403 via a snap ring 407 to hold the polygon mirror 406 in place. Further, a metal plate 409 engages the bottom end of the rotation shaft 403 such that the rotation shaft 403 is rotatable with respective to the metal plate 409.

General

FIGS. 2, 3, 4, and 5 are, respectively, a front view, a side view, a rear view, and a plan view of the dynamic balance adjusting apparatus 1000. The dynamic balance adjusting apparatus 1000 includes a base 1, a turntable 2 rotatably provided on the base 1, and an upper frame 101 provided above the turntable 2. The turntable 2 is intermittently rotated in a clockwise direction (in the view of FIG. 5) by a turntable drive mechanism 3 provided in the base 1. The dynamic balance adjusting apparatus 1000 also includes a control unit (not shown) such as a microprocessor or the like.

Figure 4:
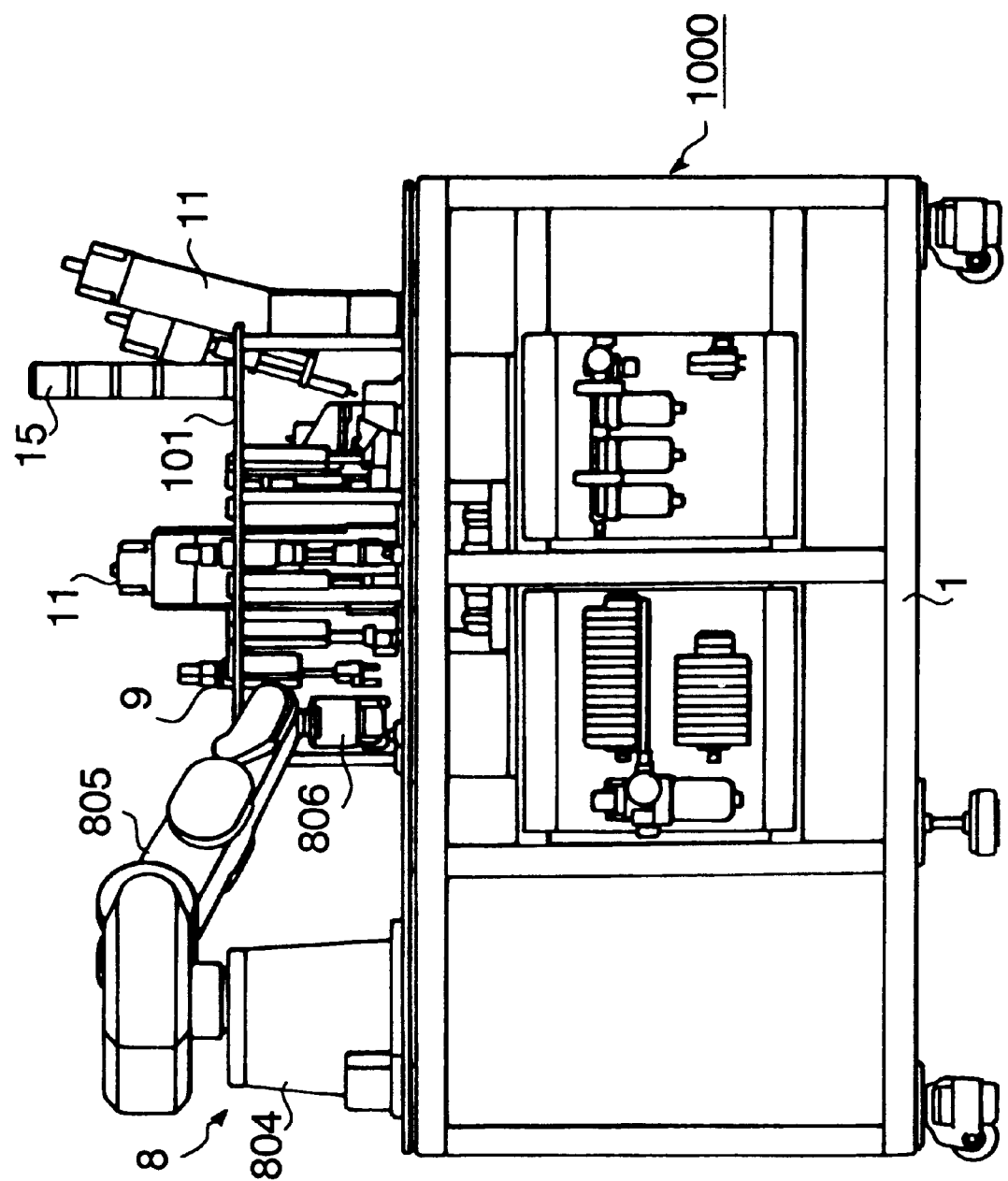
FIG. 4 is a rear view of a dynamic balance adjusting apparatus of FIG. 2.
Figure 5:
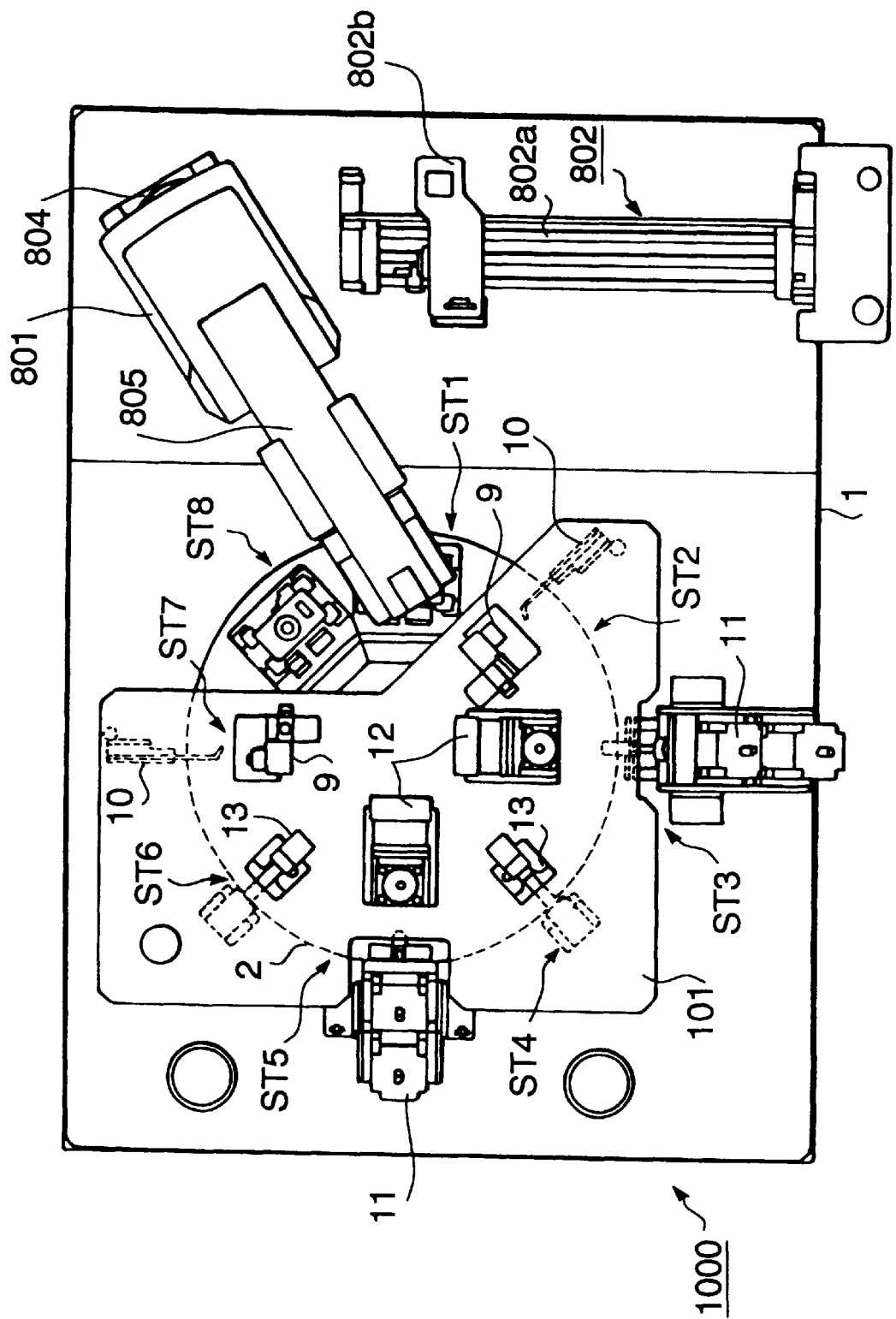
FIG. 5 is a plan view of a dynamic balance adjusting apparatus of FIG. 2.

As shown in FIG. 5, the base 1 is further provided with a feeder 802 and a robot 801. The feeder 802 is provided for carrying a polygon mirror sub-assembly 4 from an external feeder (not shown) to the vicinity of the turntable. The feeder 802 includes a rail 802a and a slidable carriage 802b which is slidable on the rail 802a. The robot 801 includes a robot arm 805, a swing mechanism 804 for horizontally swinging the robot arm 805, and a gripper 806 (see FIG. 4) provided at the lower end of the robot arm 805 for griping the polygon mirror sub-assembly 4. The robot 801 is positioned and operated to pick up the polygon mirror sub-assembly 4 from the feeder 802 and move the polygon mirror sub-assembly 4 from the feeder 802 to the turntable 2 or from the turntable 2 to the feeder 802.

Figure 6:
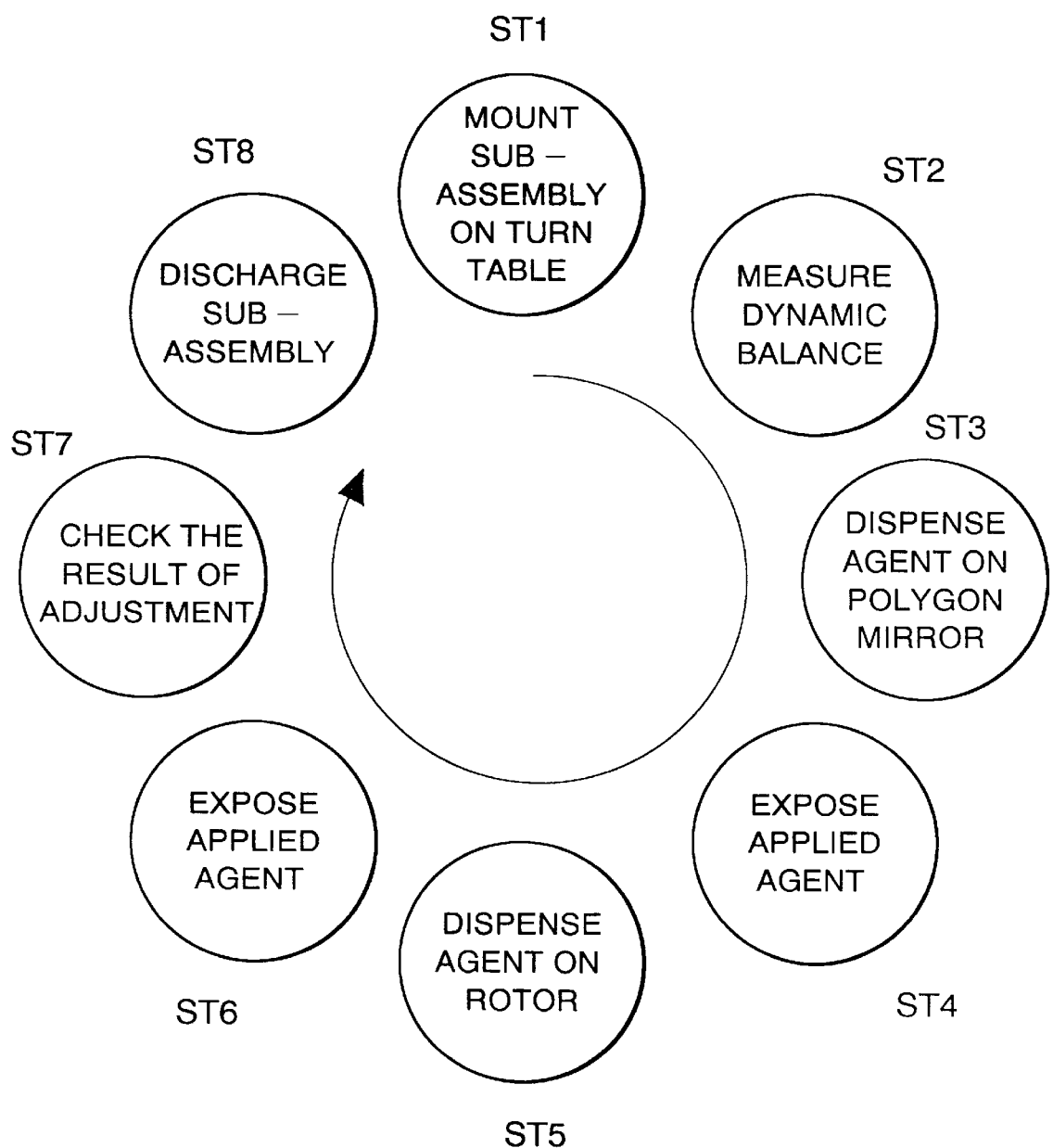
FIG. 6 is a schematic view showing processes of the dynamic balance adjusting apparatus.

An outline of the processes performed by the dynamic balance adjusting apparatus is now described. Eight stations ST1 through ST8 are arranged along the circumference of the turntable 2, as shown in FIG. 5. FIG. 6 shows processes performed at respective stations. A polygon mirror sub-assembly 4 (FIG. 1) is placed on the turntable 2 by the robot 801 at a mounting station ST1. The dynamic balance of the polygon mirror 406 is measured at a measuring station ST2. Based on the dynamic balance measurement, a balance-weight agent (plastic agent) is applied on the polygon mirror at a first dispenser station ST3. The applied balance-weight agent is hardened and fixed (i.e., cured) to the polygon mirror by ultraviolet (UV) light at a first fixing station ST4. Further, a balance-weight agent is applied on the rotor 405 at a second dispenser station ST5 and hardened (cured) by UV light at a second fixing station ST6. Then, the result of the dynamic balance adjustment is then checked at a checking station ST7. Finally, if the dynamic balance adjustment is correct, the polygon mirror sub-assembly is discharged by the robot 801 at discharge station ST8.

At each of the measuring station ST2 and the checking station ST7, an air braking system 10 (see FIG. 5) is provided for stopping the rotation of the polygon mirror 406.

Turntable

Figure 7:
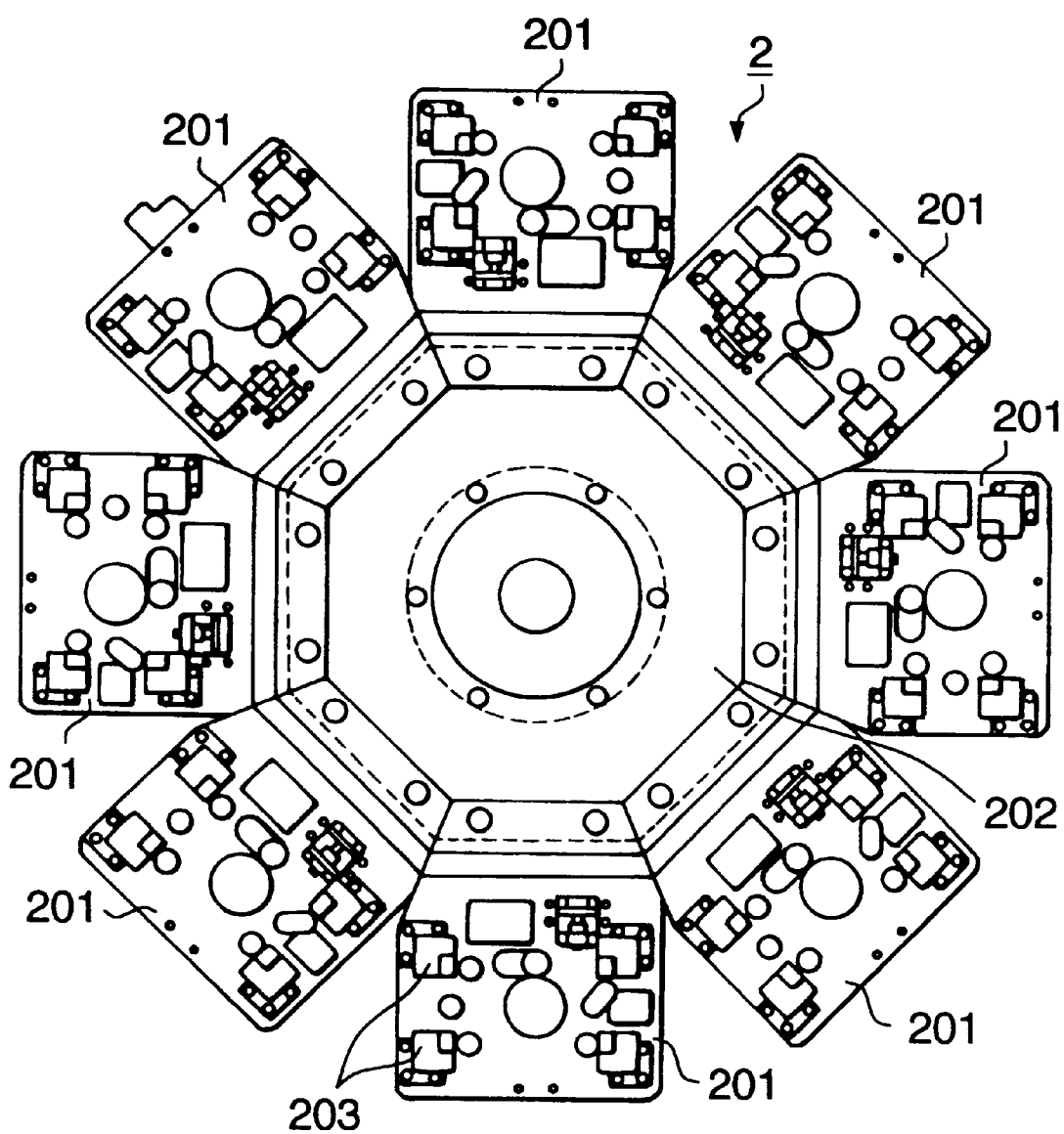
FIG. 7 is a plan view of a turntable.

FIG. 7 is a plan view of the turntable 2. The turntable 2 includes a center disk 202 that is driven by the turntable drive mechanism 3 (FIG. 1), and eight table units 201 fixed around the circumference of the center disk 202.

Figure 8:
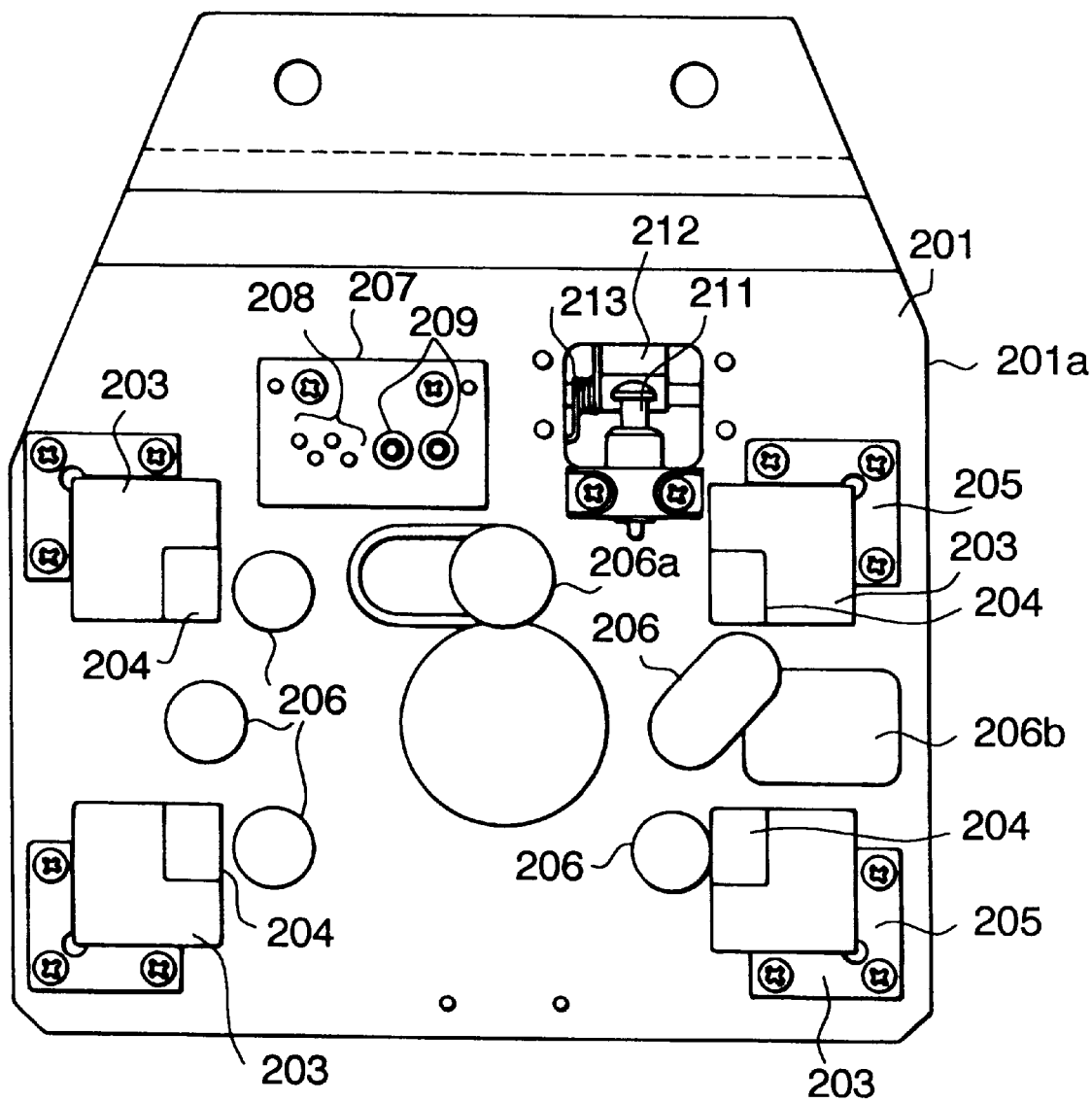
FIG. 8 is a plan view of a table unit of the turntable of FIG. 7.

FIG. 8 is a plan view of one of the table units 201. Each table unit 201 includes a trapezoid plate 201a. The plate 201a is provided with four resilient members 203, formed from sponge or the like, for supporting a holder 5 (described below) on which the polygon mirror sub-assembly 4 is mounted. Each resilient member 203 is provided with a cut-out step portion 204 for receiving a corner of the holder 5. Each of the resilient members 203 are fixed to the table unit 201 by mounting plates 205 that are adhered to the bottom of each of the resilient members 203, and secured to the table unit 201 with bolts.

Holder

Figure 9A:
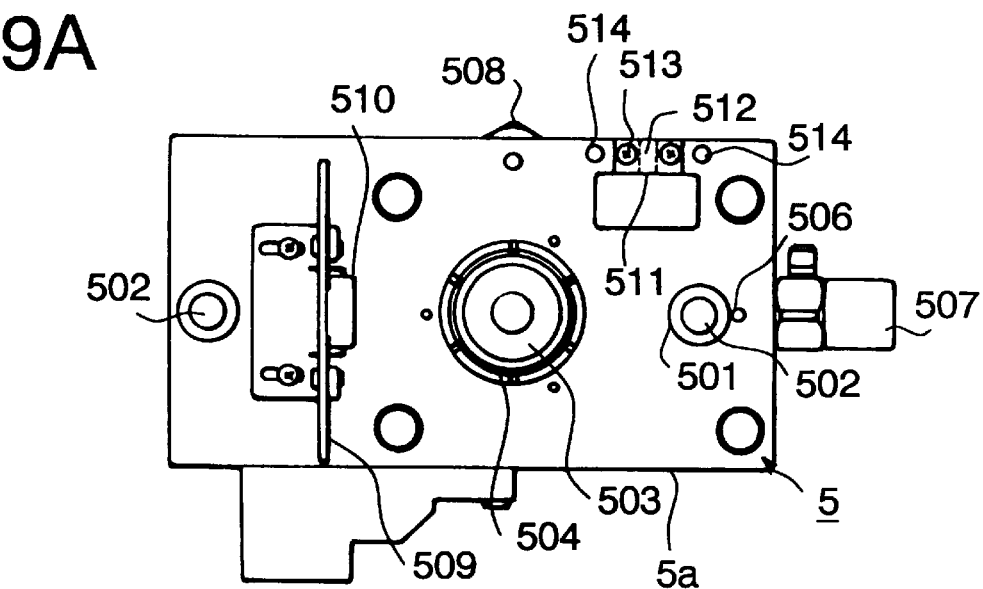
FIGS. 9A, 9B and 9C are a plan view, a sectional view, and a front view, respectively, of a holder used for the dynamic balance adjusting apparatus.
Figure 9B:
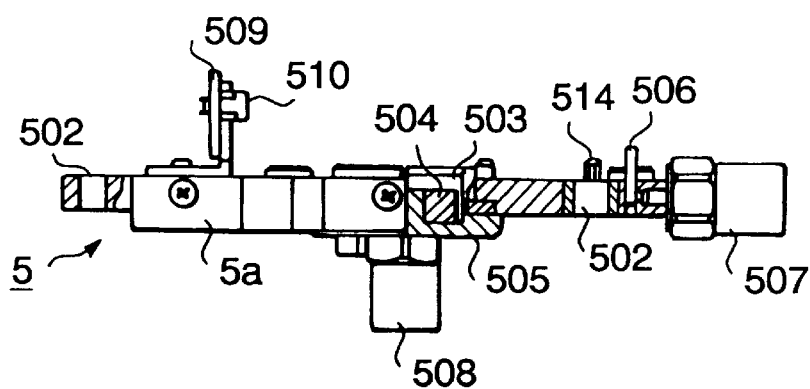
Figure 9C:
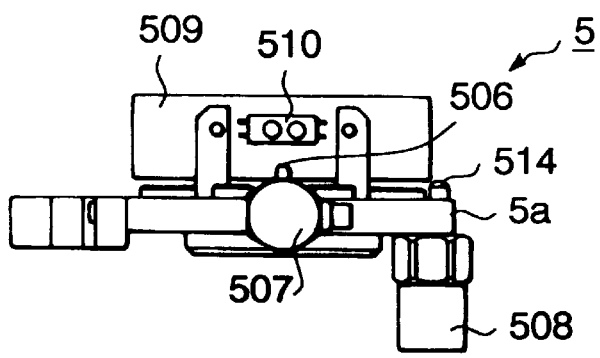

FIGS. 9A, 9B and 9C are a plan view, a front view and a side view of the holder 5. The holder 5 holds the polygon mirror sub-assembly 4 thereon and is mountable on the turntable 2. The holder 5 includes a rectangular plate 5a provided with a center cavity 503. The center cavity 503 is provided with a magnet 504 at the bottom.

Figure 10A:
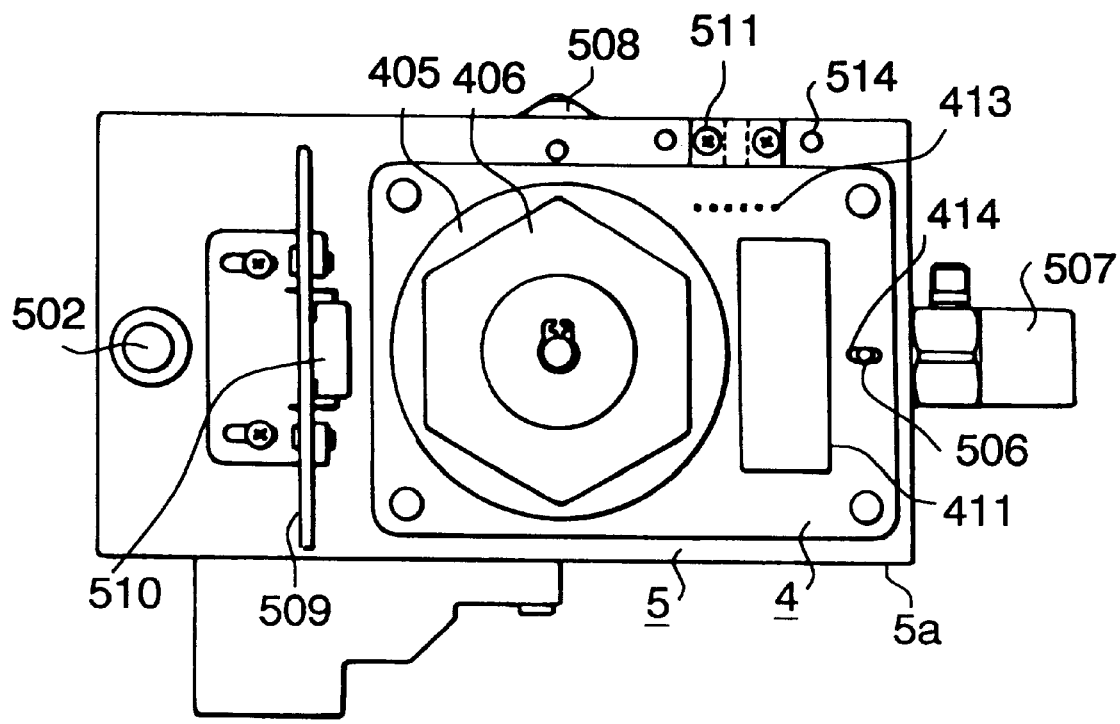
FIGS. 10A and 10B are a plan view and a sectional view respectively of the holder and the workpiece.
Figure 10B:
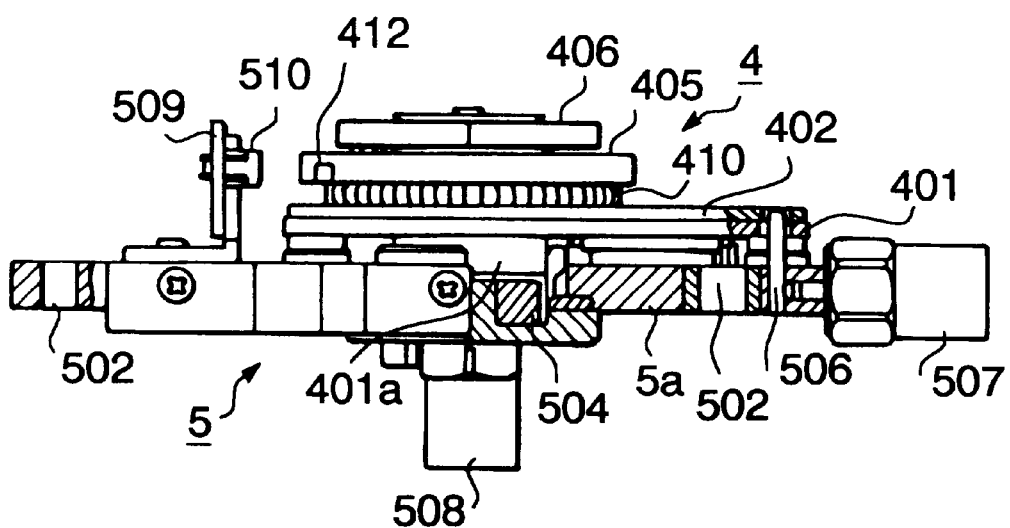

FIGS. 10A and 10B are a plan view and a front view of the holder 5 with polygon mirror sub-assembly 4 mounted on the holder 5. When a lower portion of the bracket 401a of the polygon mirror sub-assembly 4 fits into the center cavity 503, the magnet 504 magnetically attracts the metal plate 409 (shown in FIG. 1B). Thus, the sub-assembly 4 can be properly held on a holder 5.

The holder 5 is also provided with two acceleration sensors 507 and 508. The first acceleration sensor 507 is attached to the side of the plate 5a for detecting acceleration of the holder 5 in a lateral direction, and the second acceleration sensor 508 is attached to the bottom of the plate 5a for detecting acceleration of the holder 5 in a vertical direction. The table unit 201(FIG. 8) has a recess 206b and a hole 206a respectively to provide spaces for the acceleration sensor, 507 and 508.

Further, as shown in FIGS. 9A and 9B, the holder 5 includes a photo-sensor 510 and an upright plate 509 supporting the photo-sensor 510. The photo-sensor 510 is positioned to detect a positioning mark 412 (FIG. 10B) provided on the rotor 405, in order to determine the rotational position and the rotational speed of the polygon mirror 406.

As shown in FIG. 8, the table unit 201 is provided with a receptacle 207 which includes terminals 208 and 209. The terminal 208 is electrically connected with the acceleration sensors 507 and 508 and the terminal 209 is electrically connected with the photo-sensor 510. Further, as shown in FIG. 10A, the holder is provided with the positioning pin 506 which engages with the hole 414 on the polygon mirror sub-assembly 4 to position the polygon mirror sub-assembly 54 with respect to the holder 5.

Elevator Mechanism

Figure 11:
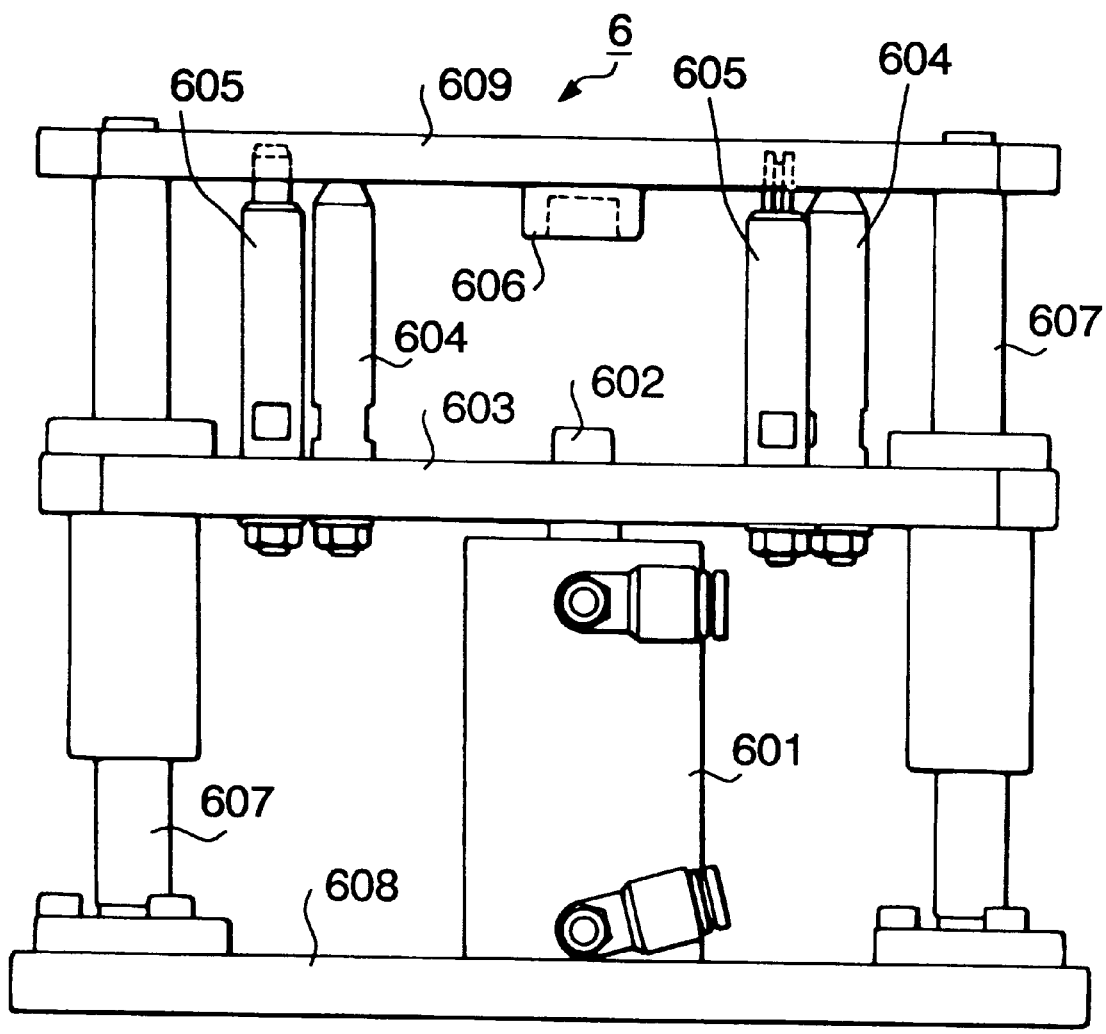
FIG. 11 is a front view of an elevator mechanism.
Figure 12:
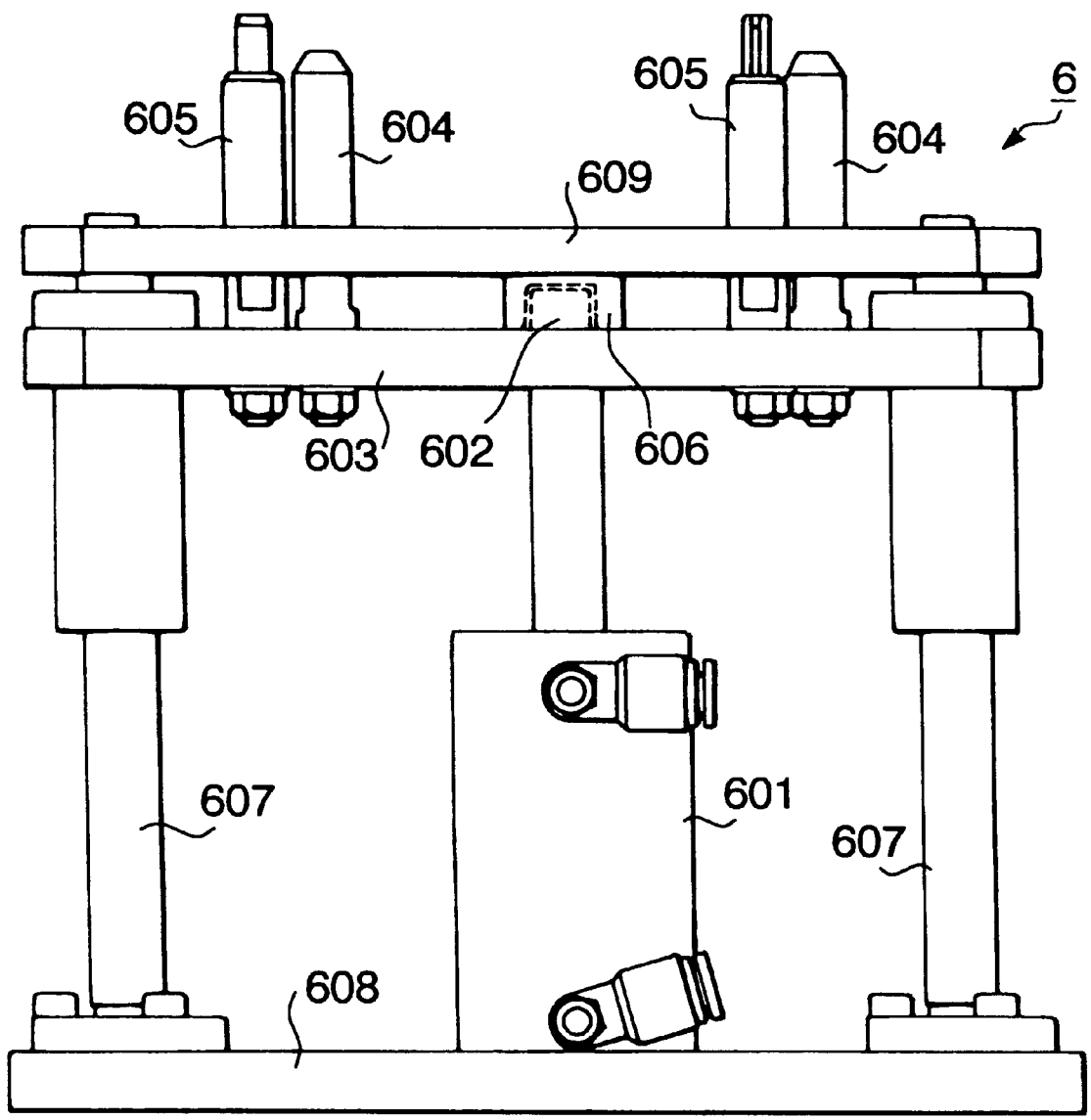
FIG. 12 is a front view of the elevator mechanism of FIG. 12 in a raised position.
Figure 13:
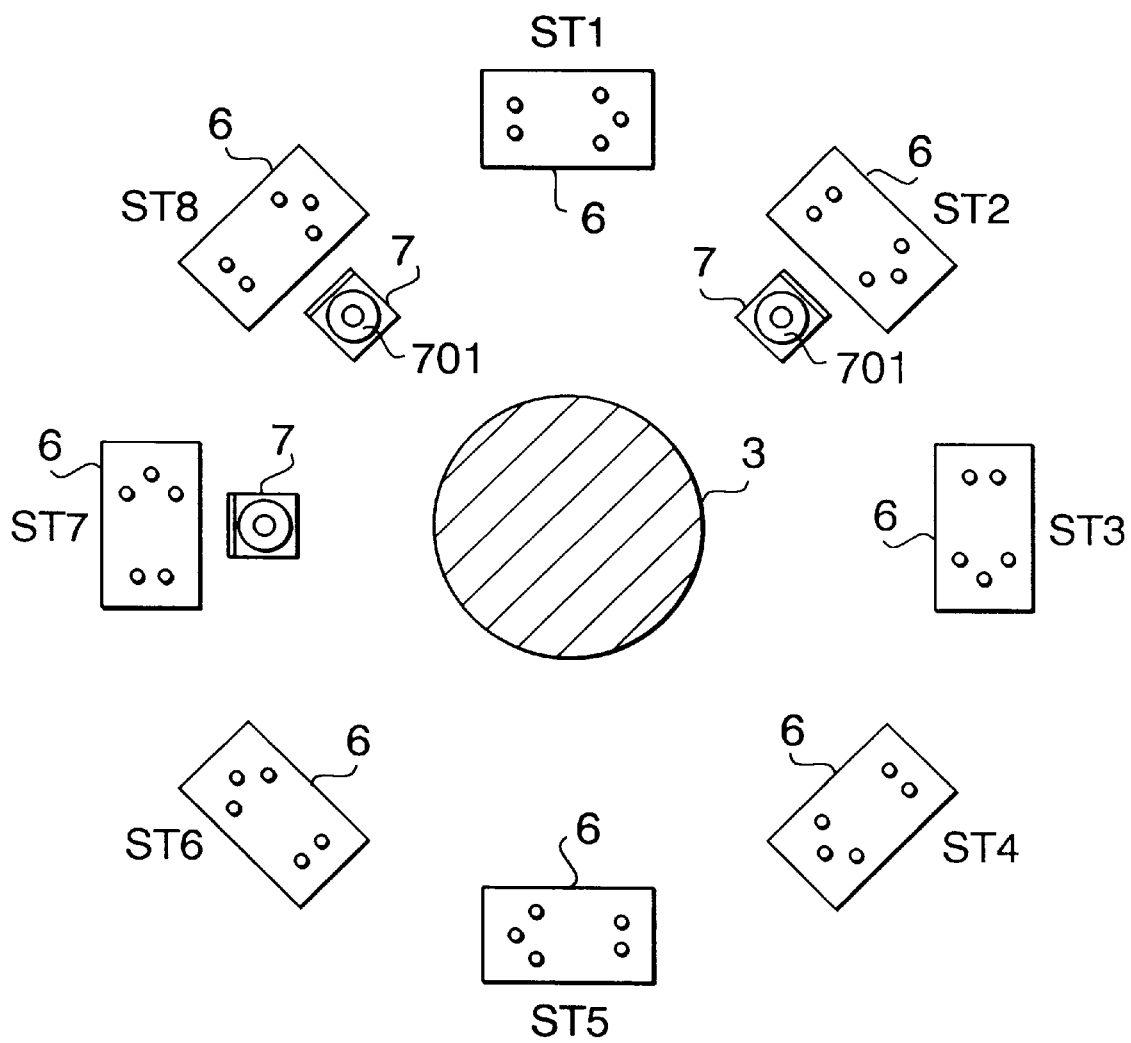
FIG. 13 is a schematic view showing locations of the elevator mechanisms and the locking mechanisms.

FIGS. 11 and 12 are front views of the elevator mechanism 6 provided to lift the holder 5 above the turntable 2. The elevator mechanism 6 includes a base plate 608, a top plate 609 and an elevator stage 603. The elevator stage 603 is moved by an air cylinder 601 provided on the base plate 608 and vertically guided by guide posts 607 provided on the base 608. The elevator stage 603 is provided with three holding pins 604 and two positioning pins 605 (only two holding pins 604 are shown in FIGS. 12 and 13). A pair of stoppers 606 and 602 are provided to the bottom surface of the top plate 609 and the top surface of the elevator stage 603, respectively, so that the elevator stage 603 only elevates until the stoppers 608 and 609 abut each other.

As shown in FIG. 8, the table unit 201 is provided with five through-holes 206 to allow the holding pins 604 and the positioning pins 605 to pass therethrough. The five through-holes 206 are aligned with the pins 604 and 605, when the eight table units 201 of the turntable 2 are stopped at respective stations.

When the elevator stage 603 moves to the uppermost position as shown in FIG. 13, the holding pins 604 and the positioning pins 605 protrude upward through the through-holes 206 (FIG. 8) of the turntable 2. The holding pins 604 abut the bottom surface of the holder 5 (FIG. 9A) and lift the holder 5. At the same time, the positioning pins 605 fit into the positioning holes 502 (FIG. 9B) of the holder 5 to set the position of the holder 5. As shown in FIG. 9A, the holder 5 is further provided with two positioning holes 502 engaging the positioning pins 605 (FIG. 12).

Figure 14:
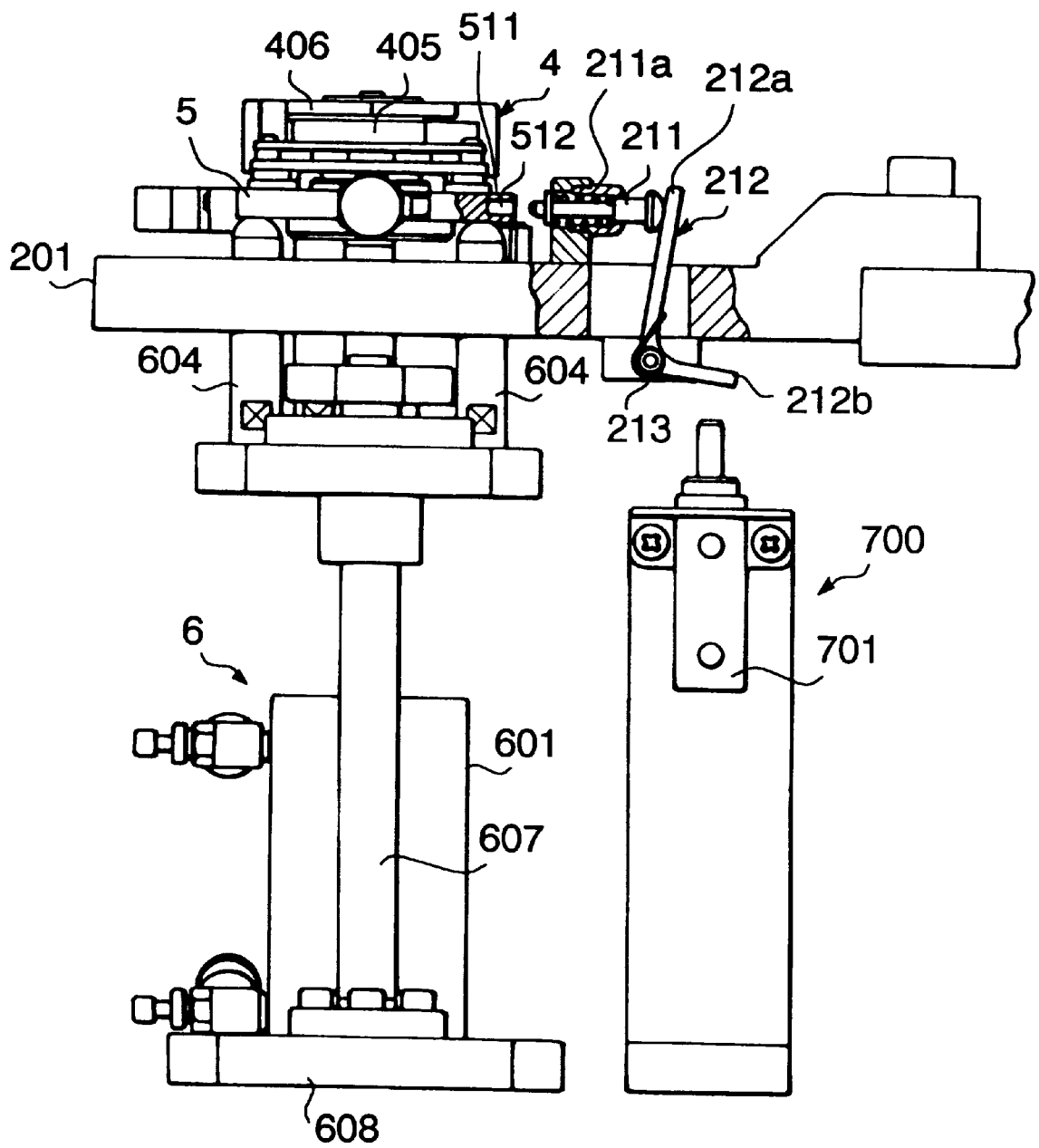
FIG. 14 is a side view showing an operation of a locking mechanism.

FIG. 14 shows the locations on the dynamic balance adjusting apparatus 1000 where the elevator mechanisms 6 and the locking actuators 7 are provided. In this embodiment, the elevator mechanism 6 is provided to any stations ST1 through ST8.

Locking Mechanism

FIG. 14 is a side view of the locking mechanism 7(FIG. 13) for locking the holder 5 at a predetermined position. The holder 5 includes a lock member 511 having a lock hole 512. A lock pin 211 is slidably supported on the table unit 201 so that the lock pin 211 can be slid into the lock hole 512. The lock pin 211 is biased away from the lock hole 512 by a spring 211a. An L-shaped swingable lever 212 is provided to the table unit 201, including vertical and lateral arms 212a and 212b. The lever 212 is swingable about a shaft 213 provided to the table unit 201 so that the vertical arm 212a swings toward and away from the lock pin 211. Further, the lever 212 is biased by a torsion spring 213 so that the vertical arm 212a swings away from the lock pin 211.

A lock actuator 700 is provided to push the lateral arm 212b to swing the vertical arm 212a toward the lock pin 211. The lock actuator 700 includes an air cylinder 701 driven to push the lateral arm 212b upward. When the lateral arm 212b is pushed upward, the vertical arm 212a swings to the left in FIG. 14. Thus, the lock pin 211 is inserted into the lock hole 512 of the holder 5, which locks the holder 5 with respect to the table unit 201.

As shown in FIG. 13, the locking actuators 7 are provided to the measuring station ST2, the checking station ST7, and the discharge station ST8.

First Connecting Mechanism

Figure 15:
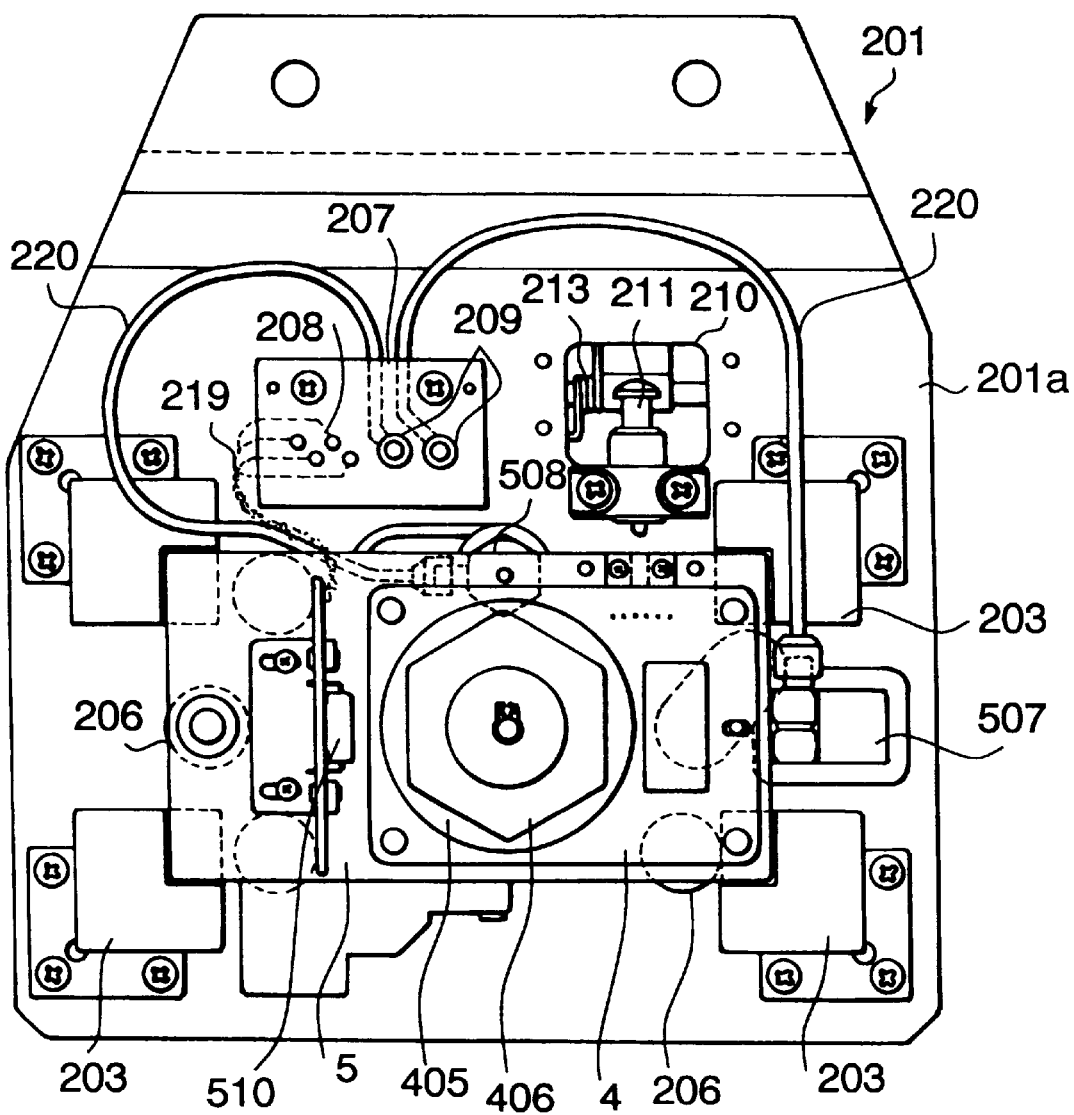
FIG. 15 is a plan view of the table unit of FIG. 8 when holding the holder that is holding the workpiece.

FIG. 15 shows the polygon mirror sub-assembly 4 mounted on the holder 5 while the holder 5 is mounted on the table unit 201. The acceleration sensors 507 and 508 are wired to the terminals 209 of the receptacle 207 via coaxial cables 220. The photo-sensor 510 is wired to the terminal 208 of the receptacle 207 via single cables 219. Since the acceleration sensors 507 and 508 and the photo-sensor 510 are used only at the measuring station ST2 and the checking station ST7, a connecting device 9 (including first and second connecting mechanisms 9a and 9b) is provided for making a connection between the control unit and the holder 5 and the workpiece 4. The connecting device 9 is provided to the upper frame 101 (FIG. 2), above each of the measuring station ST2 and the checking station ST7.

Figure 16A:
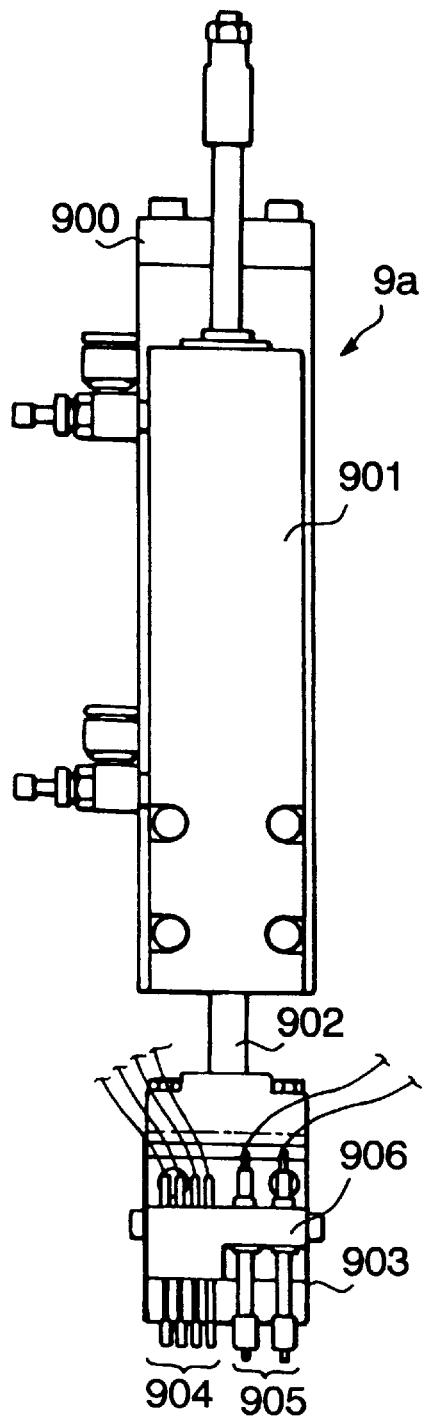
FIGS. 16A and 16B are, respectively, a front view and a side view of a first connecting mechanism.
Figure 16B:
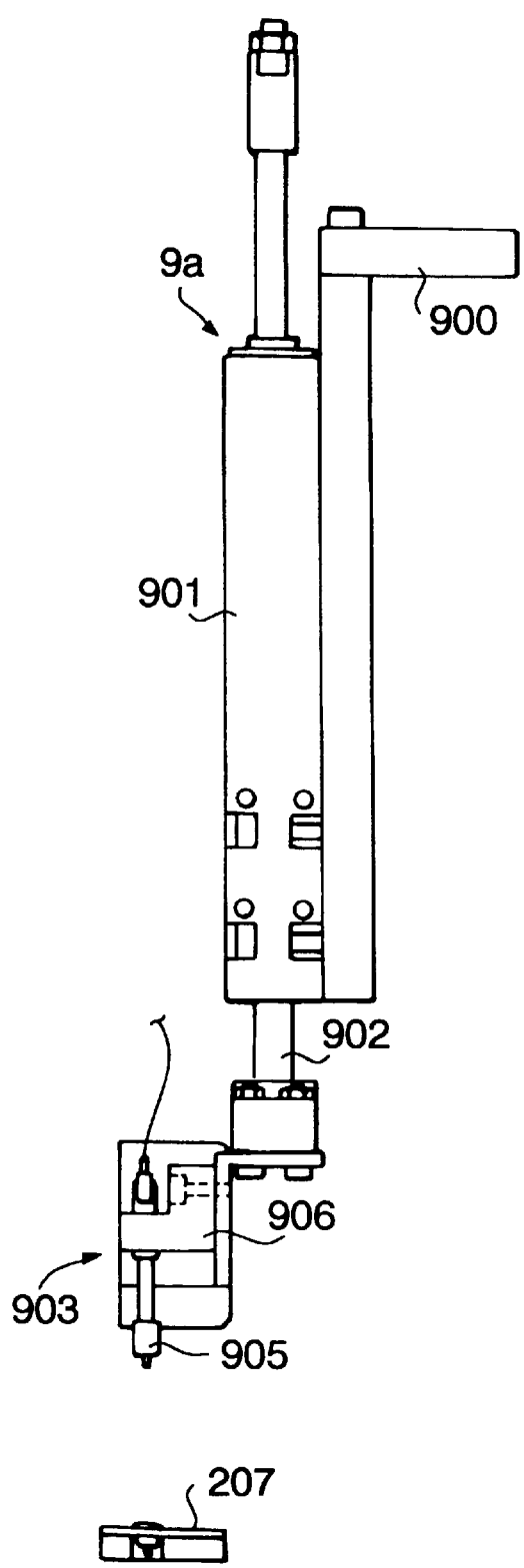

FIGS. 16A and 16B are a front view and a side view of the first connecting mechanism 9a. The first connecting mechanism 9a includes a mounting member 900 to be fixed to the upper frame 101 (FIG. 2), an air cylinder 901 provided to the mounting member 900, and a plug unit 903 provided at the tip of a rod 902 of the air cylinder 901. The plug unit 903 includes a support 906 made of an insulating material, four stationary contact pins 904, and two extendible contact pins 905 mounted to the support 906. The contact pins 904 and 905 are connected to a control unit (CU) via cables (not shown). When the air cylinder 901 actuates the rod 92 downward, the plug unit 903 is moved toward and is plugged in the receptacle 207 of the turntable 2 (FIG. 8).

Figure 17:
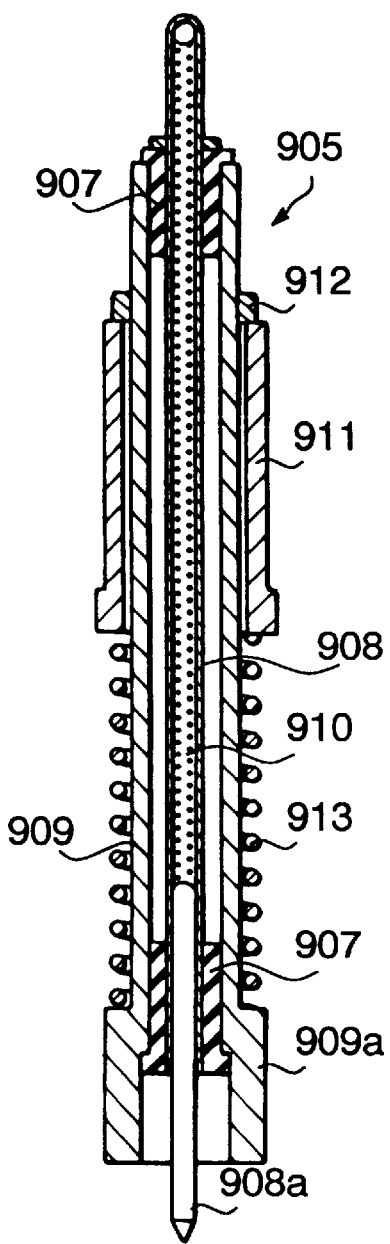
FIG. 17 is a sectional view of a extendible pin of the first connecting mechanism.

FIG. 17 is a cross-section of the extendible contact pin 905. The contact pin 905 includes two coaxial tubes 908 and 909. The outer tube 909 and the inner tube 908 are made of conductive material. An insulation sleeve 907 is provided between the two tubes 908 and 909. The inner tube 908 houses a coil spring 910 and a needle 908a fixed to the bottom end of the coil spring 910 and protruding downward. The outer tube 909 is further inserted in a mounting sleeve 911, which is mounted to the support 906. A coil spring 913 is provided between the mounting sleeve 911 and a flange portion 909a formed at the bottom end of the outer tube 909. Thus, the outer tube 909 is flexibly supported to protrude with respect to the support 906, and the needle 908a is flexibly supported to protrude with respect to the outer tube 909.

Figure 18:
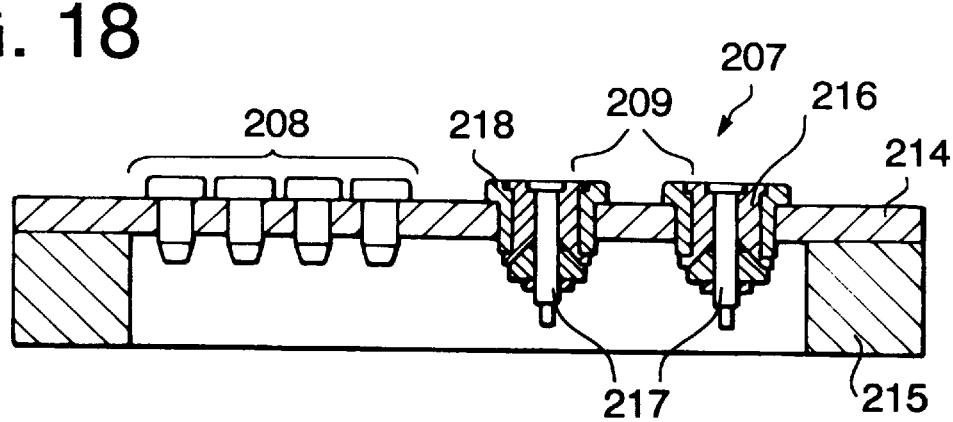
FIG. 18 is a sectional view of a receptacle on the turntable.

FIG. 18 is a cross-section of the receptacle 207 on the turntable 2 (FIG. 8). The receptacle 207 includes an insulation board 214 provided with four terminals 208 (wired to the photo sensor 510) and two terminals 209 (wired to the acceleration sensors 507 and 508). The insulation board 214 is fixed on a spacer 215 which is fixed to the turntable 2 via a screw (not shown). Each of the terminals 209 includes coaxial inner and outer elements 217 and 218, with an insulation tube 216 inserted therebetween. Below the insulation board 214, the inner and outer elements 217 and 218 are respectively connected to outer and inner layers of the coaxial cables 220 (FIG. 15). When each contact pin 905 (FIGS. 16A and 16B) is moved onto the receptacle 207, the needle 908a (FIG. 17) contacts the inner element 217, and the outer tube 909 (FIG. 17) contacts the outer contact 218, respectively. Thus, each contact pin 905 is connected to each coaxial cable 220.

Second Connecting Mechanism

Figure 19A:
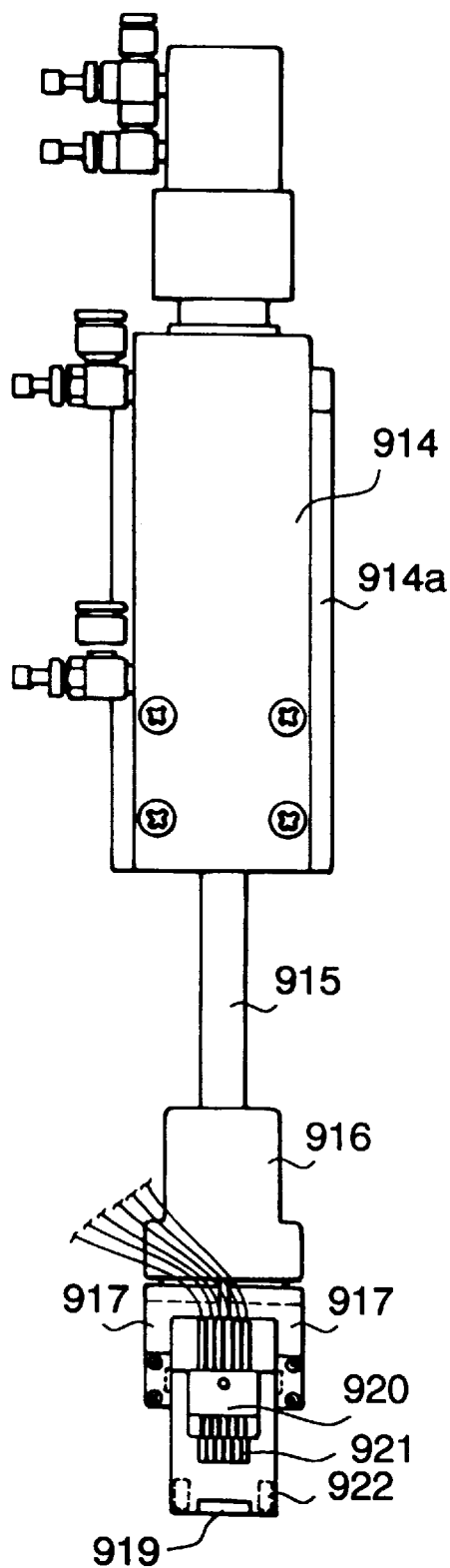
FIGS. 19A and 19B are, respectively, a front view and a side view of a second connecting mechanism.
Figure 19B:
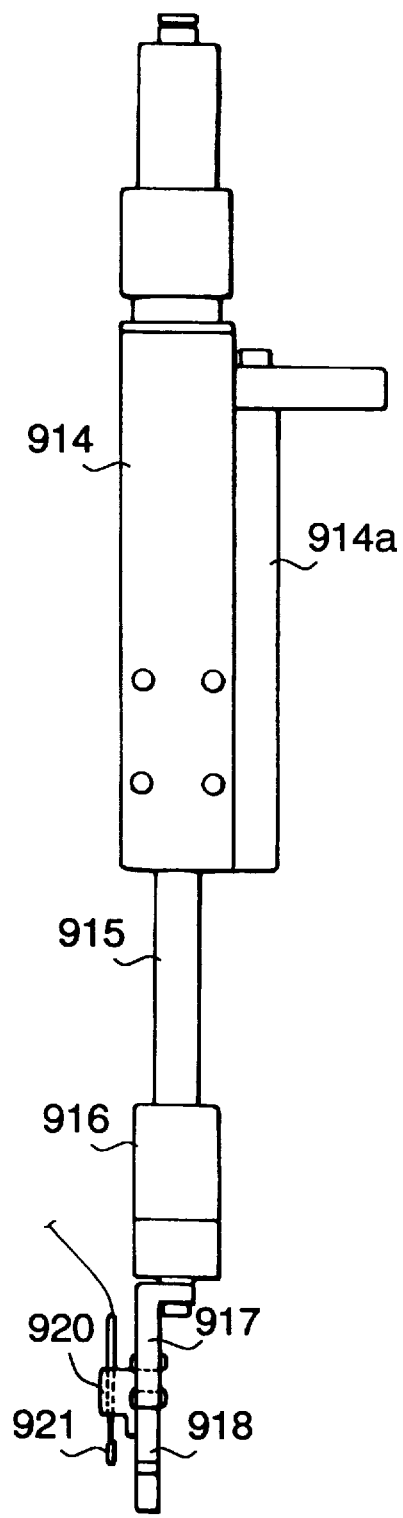

FIGS. 19A and 19B are a front view and a side view of a second connecting mechanism 9b for connecting the polygon mirror sub-assembly 4 and the control unit CU, and specifically the mounting member 511 of the holder 5. As shown in FIG. 9A, the mounting member 511 of the holder 5 further includes an upper portion magnet 513 and two guide pins 514 that are provided on either side of the upper portion magnet 513.

Figure 20A:
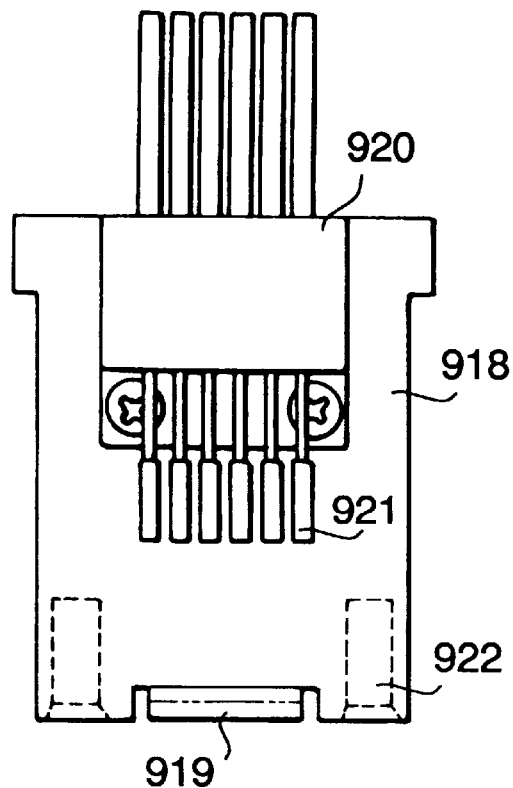
FIGS. 20A and 20B are, respectively, a front view and a side view of a connector unit of the second connecting mechanism.
Figure 20B:
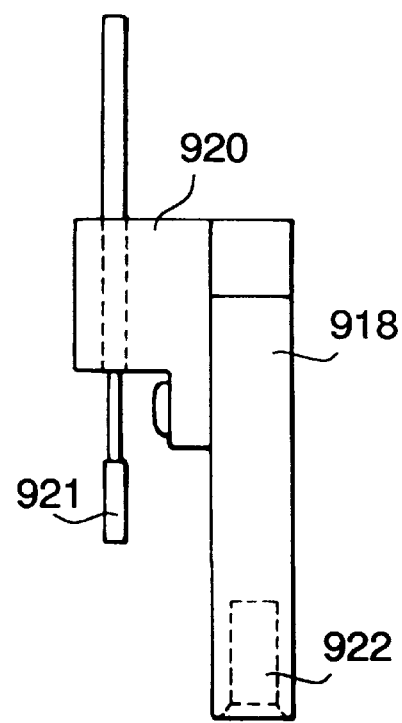
Figure 21A:
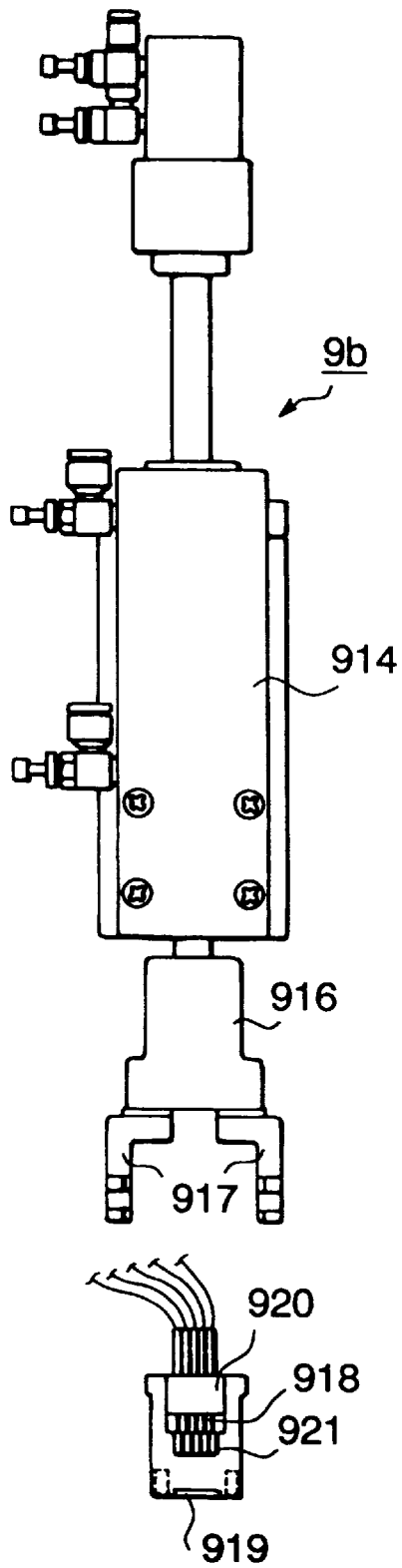
FIGS. 21A and 21B are, respectively, a front view and a side view of the second connecting mechanism after releasing the connector unit.
Figure 21B:
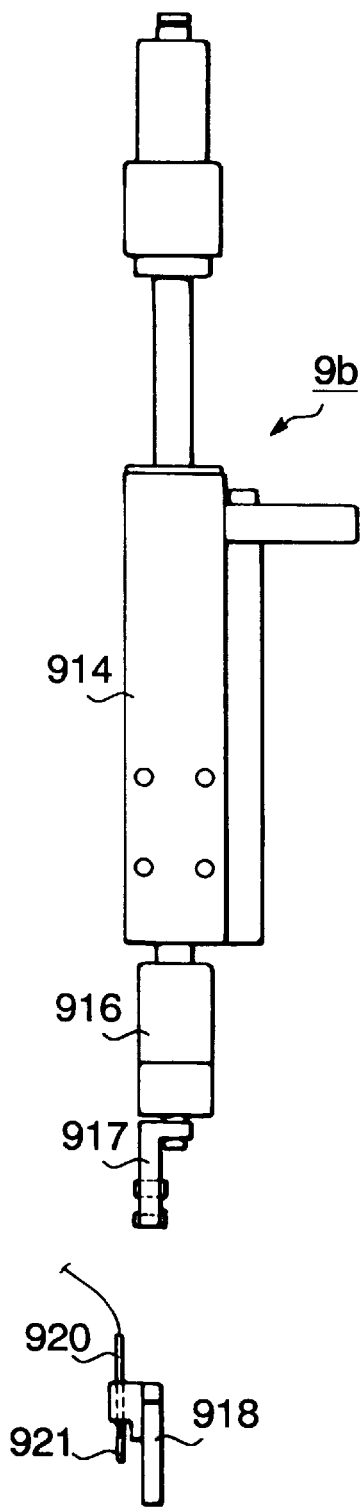
Figure 22A:
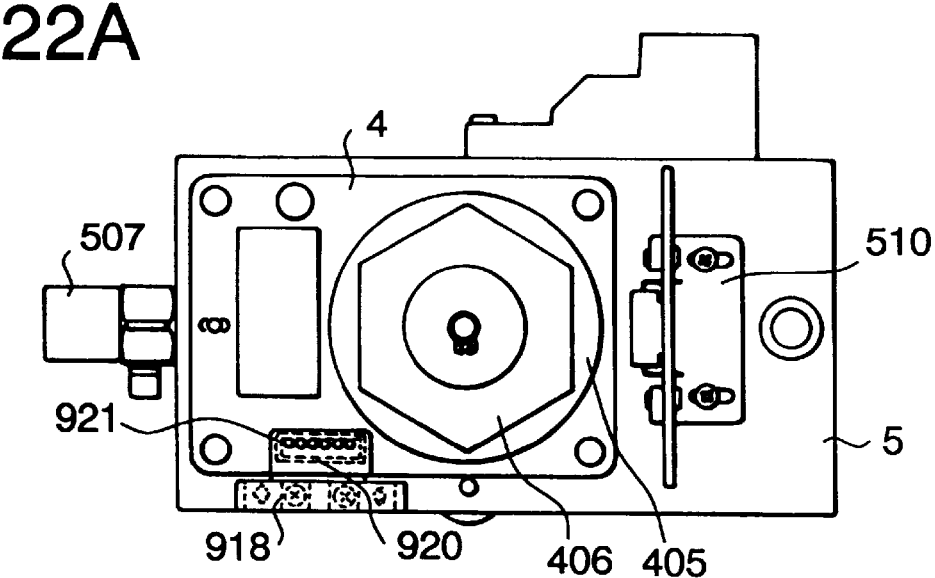
FIGS. 22A, 22B and 22C are, respectively, a plan view, a side view and a front view of the holder, holding the polygon mirror sub-assembly, when the connector unit of FIGS. 20A and 20B is attached.
Figure 22B:
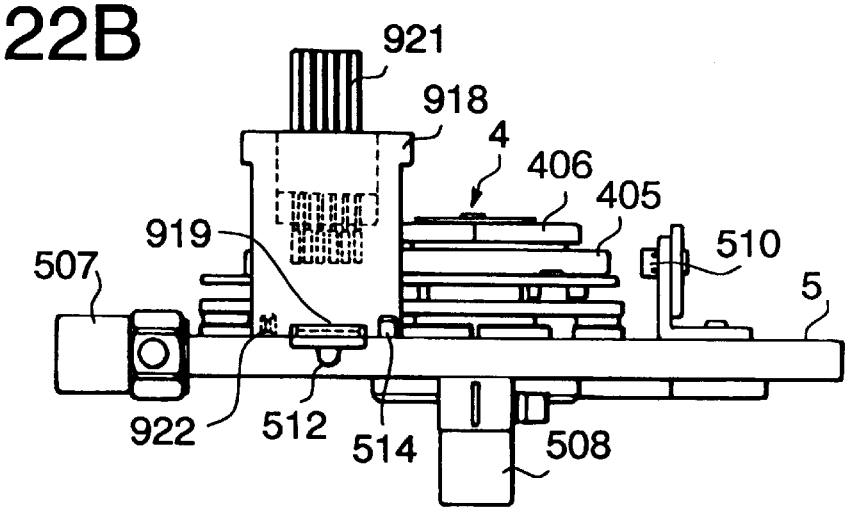
Figure 22C:
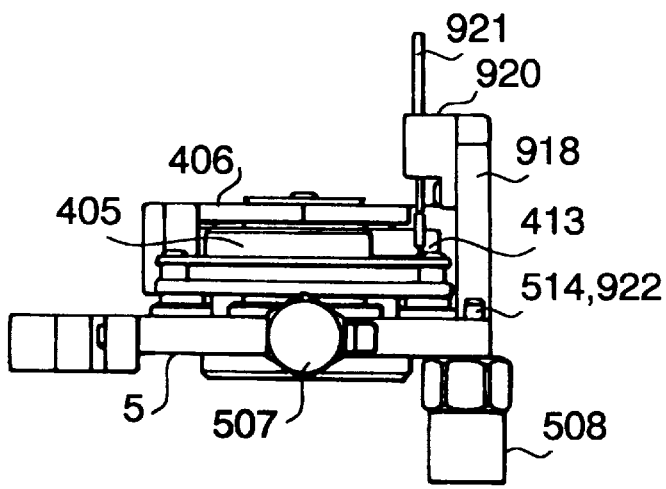

The second connecting mechanism 9b includes a mounting member 914a to be fixed to the upper frame 101 (FIG. 2), an air cylinder 914 mounted to the mounting member 914a, and a chuck 916 provided at the tip of a rod 915 of the air cylinder 914. The chuck 916 has a pair of jaws 917 that grip a connector block 918. FIGS. 20A and 20B are a front view and a side view of the connector block 918. The connector block 918 is provided with five contact pins 921 (made of conductive material) and an insulation support 920 for supporting the contact pins 921. The top ends of each contact pin 921 are connected to the control unit via a cable (not shown). The connector block 918 is provided with a magnet 919 (at the bottom) for fixing the connector block 918 onto the polygon mirror sub-assembly 4. The connector block 918 has two holes 922 for positioning the connector block 918 with respect to the polygon mirror sub-assembly 4. The holes 922 correspond to the guide pins 514 (FIGS. 10A). FIGS. 21A and 21B are a front view and a side view of the second connecting mechanism 9b when the chuck 916 has released the connector block 908. FIGS. 22A, 22B and 22C are a plan view, a front view and a side view of the polygon mirror sub-assembly 4 supported on the holder 5. As shown in FIGS. 21A and 21B, the chuck 916 releases the connector block 918 on the holder 5 (thus, the connector block 918 is placed on the holder 5). In this step, the magnet 919 of the connector block 918 is attracted to the upper portion magnet 513 of the mounting member 511 (FIG. 10A) of the holder 5. At the same time, the guide pins 514 are inserted to the holes 922. The polygon mirror sub-assembly 4 is thereby connected to the control unit CU so that the control unit CU is able to control the polygon mirror sub-assembly 4 to rotate the polygon mirror 406.

Dispenser

Figure 23A:
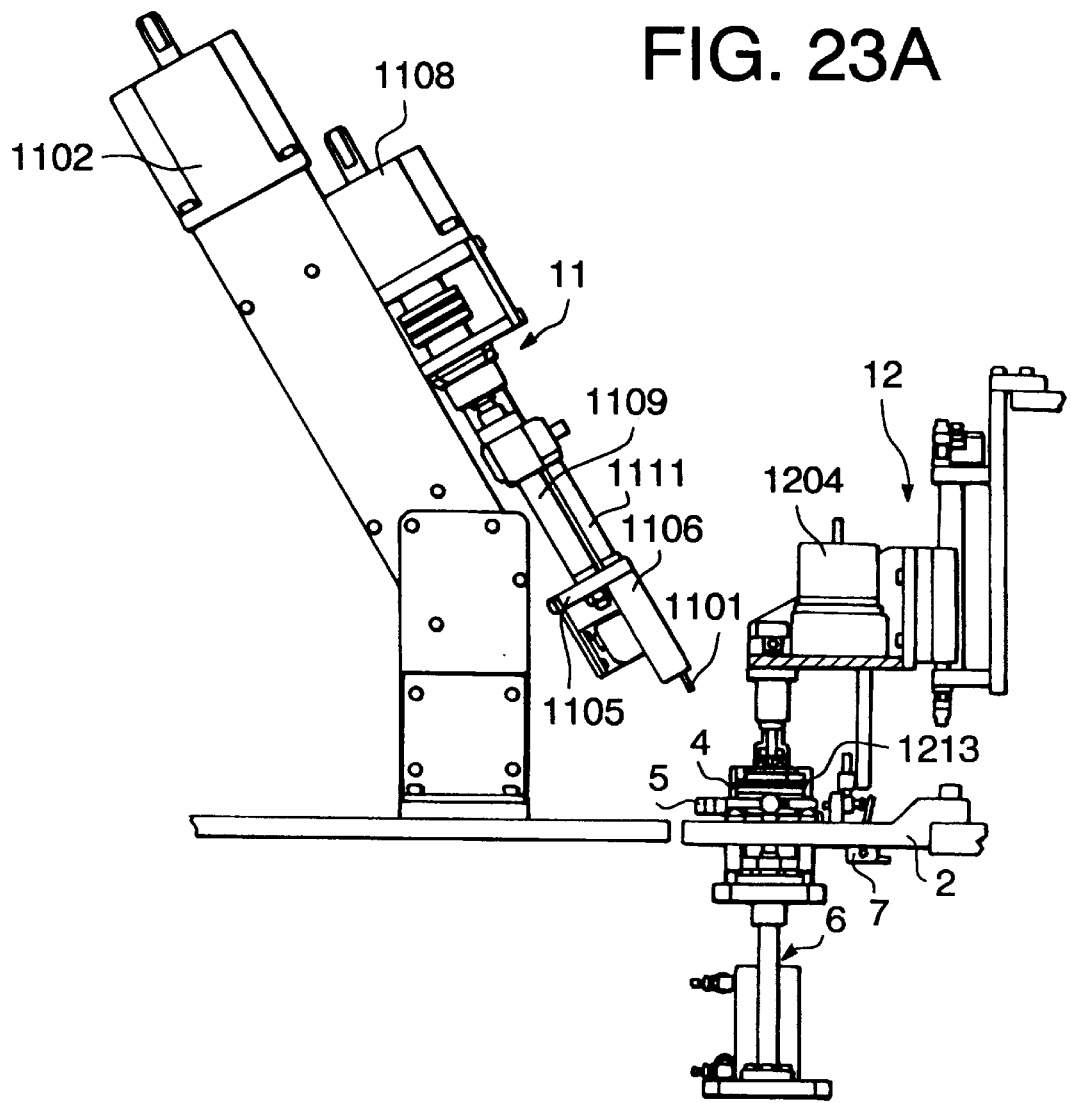
FIGS. 23A and 23B are a side view and a schematic side view, respectively, of a dispenser.
Figure 23B:
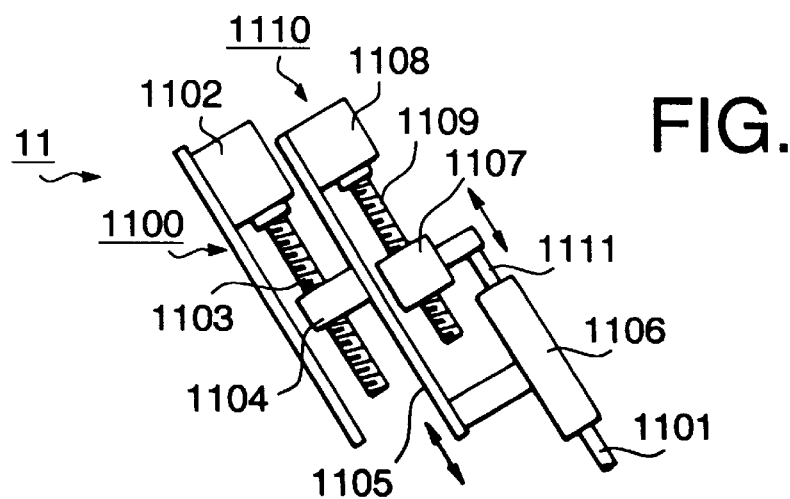

FIG. 23A is a detailed view showing a dispenser 11 of the dynamic balance adjusting apparatus 1000, and FIG. 23B is a detailed side view of the dispenser 11 from an opposite side. As shown in FIGS. 23A and 23B, the dispenser 11 includes a cylinder 1106 in which a balance-weight agent (such as a plastic material or the like) is sealed. In order to move the cylinder 1106, a first ball screw unit 1100 is provided. The first ball screw unit 1100 includes a screw 1103, a motor 1102 for rotating the screw 1103, a nut 1104 engaging the screw 1103, and a cylinder mount 1105 fixed to the nut 1104. The rotation of a screw 1103 moves the cylinder mount 1105 (and thus, the cylinder 1106) toward and away from the polygon mirror 406 of the polygon mirror sub-assembly 4. For dispensing, a second ball screw unit 1110 is provided on the cylinder mount 1105. The second ball screw unit 1110 includes a screw 1109, a motor 1108 for rotating the screw 1109, and a nut 1107 fixed to the piston 1111. The rotation of the screw 1109 moves the piston 1111 to dispense the balance-weight agent from the cylinder 1106.

A dispenser 11 is provided to each of the first and second dispenser stations ST3 and ST5 (see FIG. 5) and positioned to dispense the balance-weight agent to the polygon mirror 406 and the rotor 405, respectively. Since the fixing units 13 use ultraviolet light in this embodiment, the balance-weight agent is preferably an ultraviolet curing agent.

Positioning mechanism of the Polygon Mirror

Figure 24:
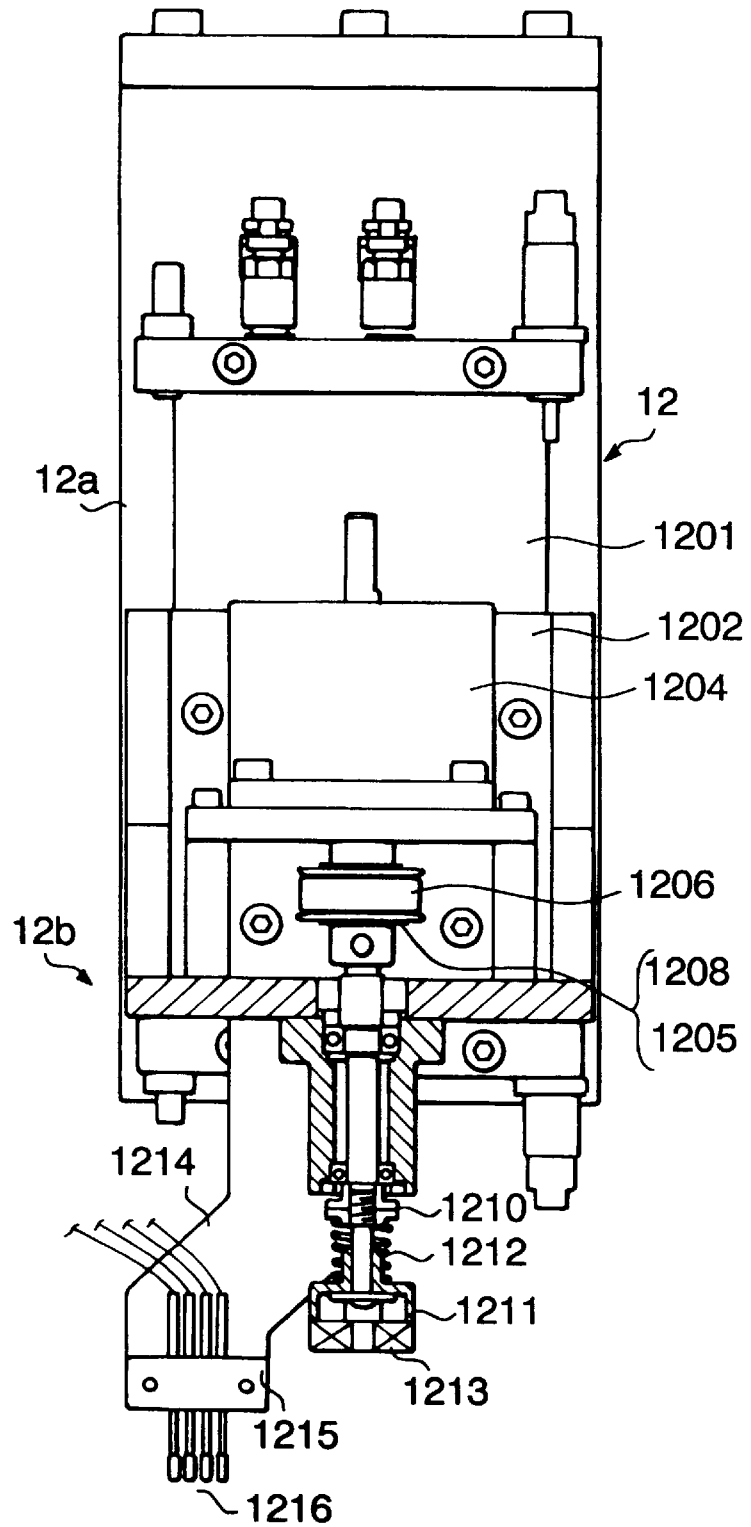
FIG. 24 is a front view of a positioning mechanism.
Figure 25:
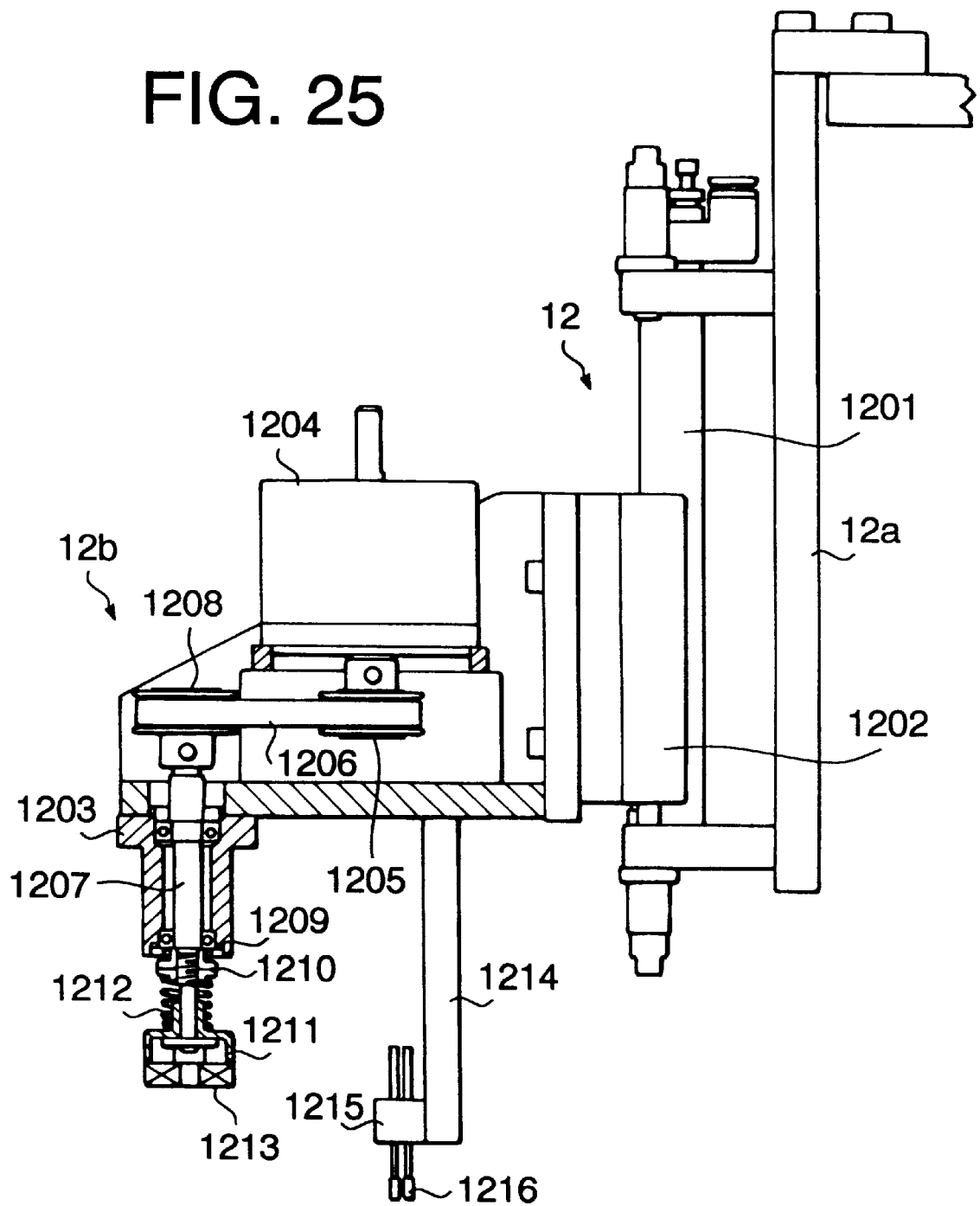
FIG. 25 is a side view of the positioning mechanism of FIG. 24.

As shown in FIG. 23A, the positioning mechanism 12 is provided above the polygon mirror 406. FIGS. 24 and 25 are a front and a side view of the positioning mechanism 12. The positioning mechanism 12 includes a mounting member 12a mounted to the upper frame 101 (FIG. 1) and an air cylinder 1201 provided on the mounting member 12a which vertically moves a carriage 1202. A drive unit 12b, supported on the carriage 1202, includes a rotation shaft 1207 and a stepping motor 1204 for rotating the shaft 1207. The rotation of the motor 1204 is transmitted to the rotation shaft 1207 via pulleys 1205 and 1208 and a drive belt 1206. The rotation shaft 1207 is supported by a bracket 1203 provided on the bottom surface of the carriage 1202, via a bearing 1209. A contact rolling member 1211 is slidably provided to the bottom end of the rotation shaft 1207. In order to bias the contact rolling member 1211 to the upper surface of the polygon mirror 406, a coil spring 1212 is provided between the contact rolling member 1211 and a sleeve 1210 is provided around the shaft 1207. The contact rolling member 1211 is provided with a rubber member 1213 at the bottom end thereof, for contacting the upper surface of the polygon mirror 406.

An arm 1214 extends downward from the bottom of the carriage 1202. A support block 1215 (made of an insulating material) is provided at a bottom end of the arm 1214. The support block 1215 supports four contact pins 1216. When the positioning mechanism 12 lowers the arm 1214, the arm 1214 moves toward the receptacle 207 on the table unit 201 and the connector pins 1216 contact the receptacle 207 (i.e., connect to the photo-sensor 510).

With this arrangement, the positioning mechanism 12 is able to rotate the polygon mirror 406 by contacting and rotating the contact rolling member 1211. Further, since the positioning mechanism 12 can be connected to the photo-sensor 510, the control unit CU is able to recognize the rotational position of the polygon mirror 406.

Fixing Unit

Figure 26:
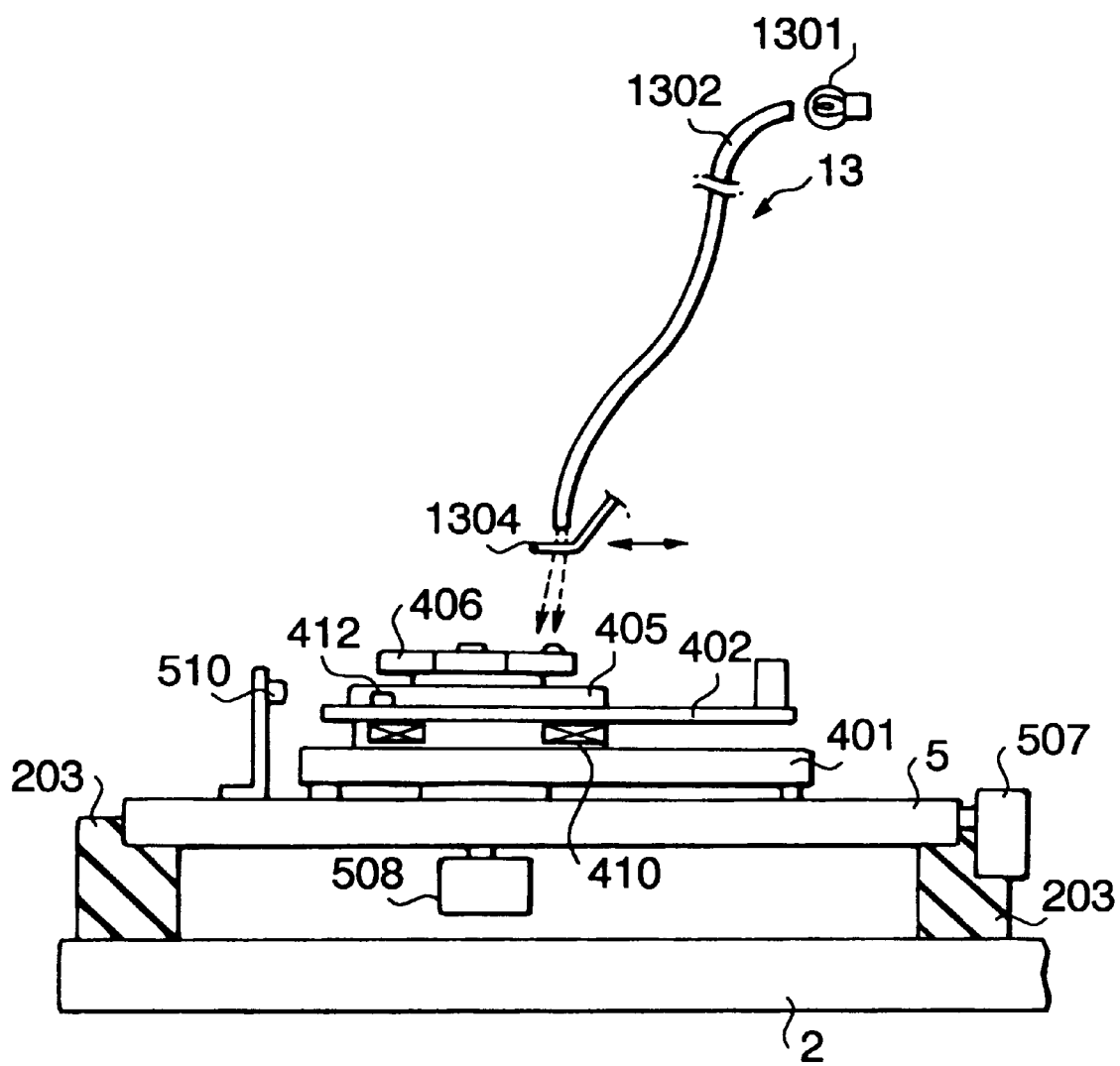
FIG. 26 is a side view of a fixing device.

A fixing unit 13 is provided to the first and second fixing stations ST4 and ST6 (FIG. 4). FIG. 26 is a side view of the fixing unit 13. The fixing unit 13 includes an ultraviolet (UV) lamp 1301 provided on the upper frame 101, an optical fiber 1302 for introducing UV light onto the polygon mirror 406 (or rotor 405), and a shield 1304 for shielding an end of the optical fiber 1302. The optical fiber 1302 passes UV rays.

The shield 1304 can be retracted from a shielding position by a retracting mechanism (not shown), which allows the UV light to be exposed onto the polygon mirror 406.

Detailed Operation

The operation of the dynamic balance adjusting apparatus 1000 is described.

The control unit CU controls the turntable 2 to move such that table units 102 are positioned appropriately at each of stations ST1 to ST8, performs a predetermined process for each station ST1 to ST8, rotates the turntable 2 such that the table units 102 advance to the next station ST1 to ST8, and repeats the predetermined processes. The processes at each of the stations ST1 to ST8 are performed simultaneously.

Figure 27:
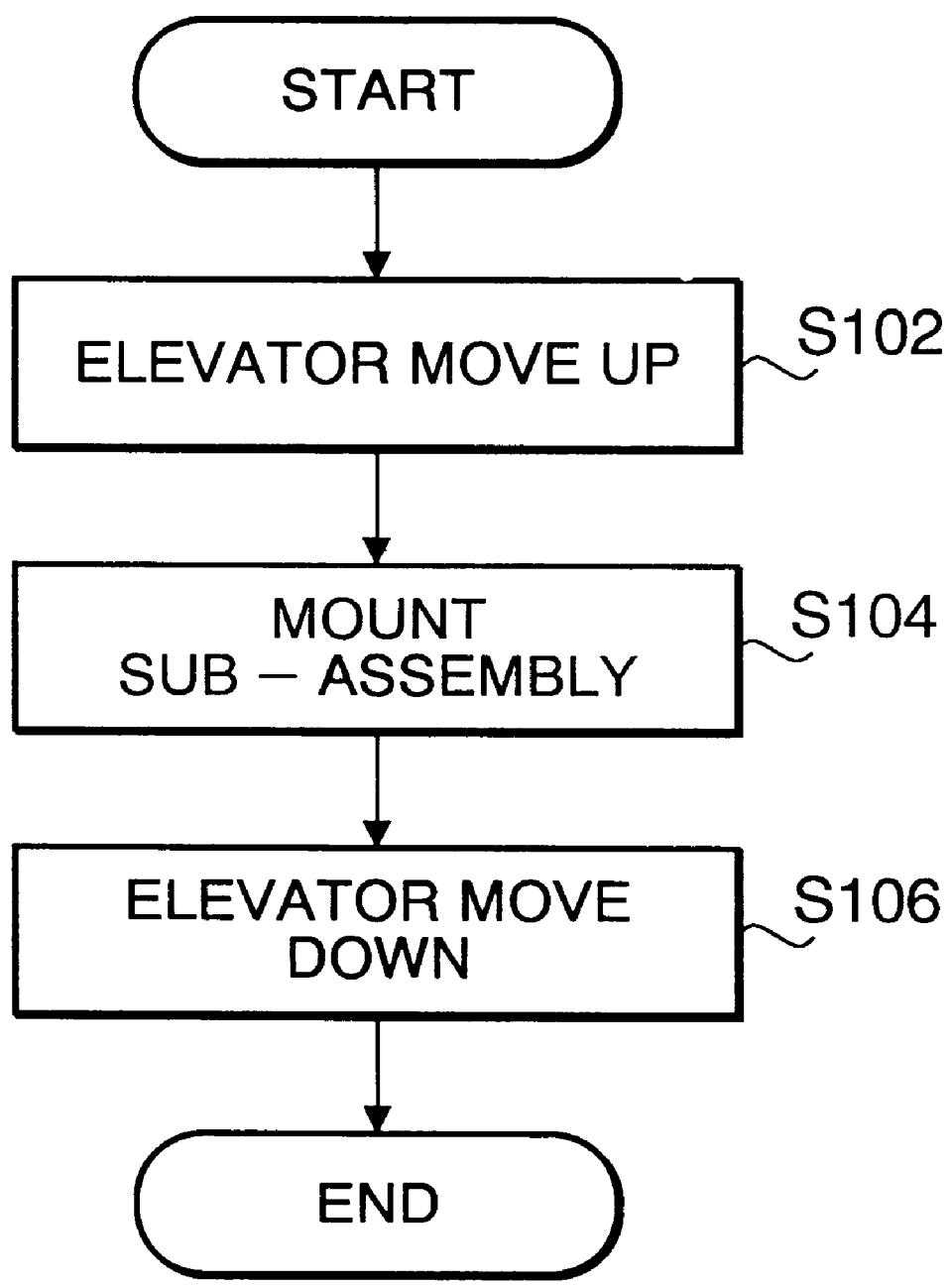
FIG. 27 is a flow chart showing a process at a mounting station.

FIG. 27 is a flow chart showing the process at the mounting station ST1. First, the elevator mechanism 6 lifts up the holder 5 (step S102) so that the holder 5 is accurately supported and positioned by the elevator mechanism 6. The robot 801 is then driven to pick up a polygon mirror sub-assembly 4 from the feeder 802, and mount the polygon mirror sub-assembly 4 on the holder 5 (step S104). After the polygon mirror sub-assembly 4 is mounted on the holder 5, the elevator mechanism 6 is retracted beneath the turntable 2 (step S106). Thus, the holder 5 is left resiliently supported on the turntable 2 by the four resilient members 203.

Figure 28:
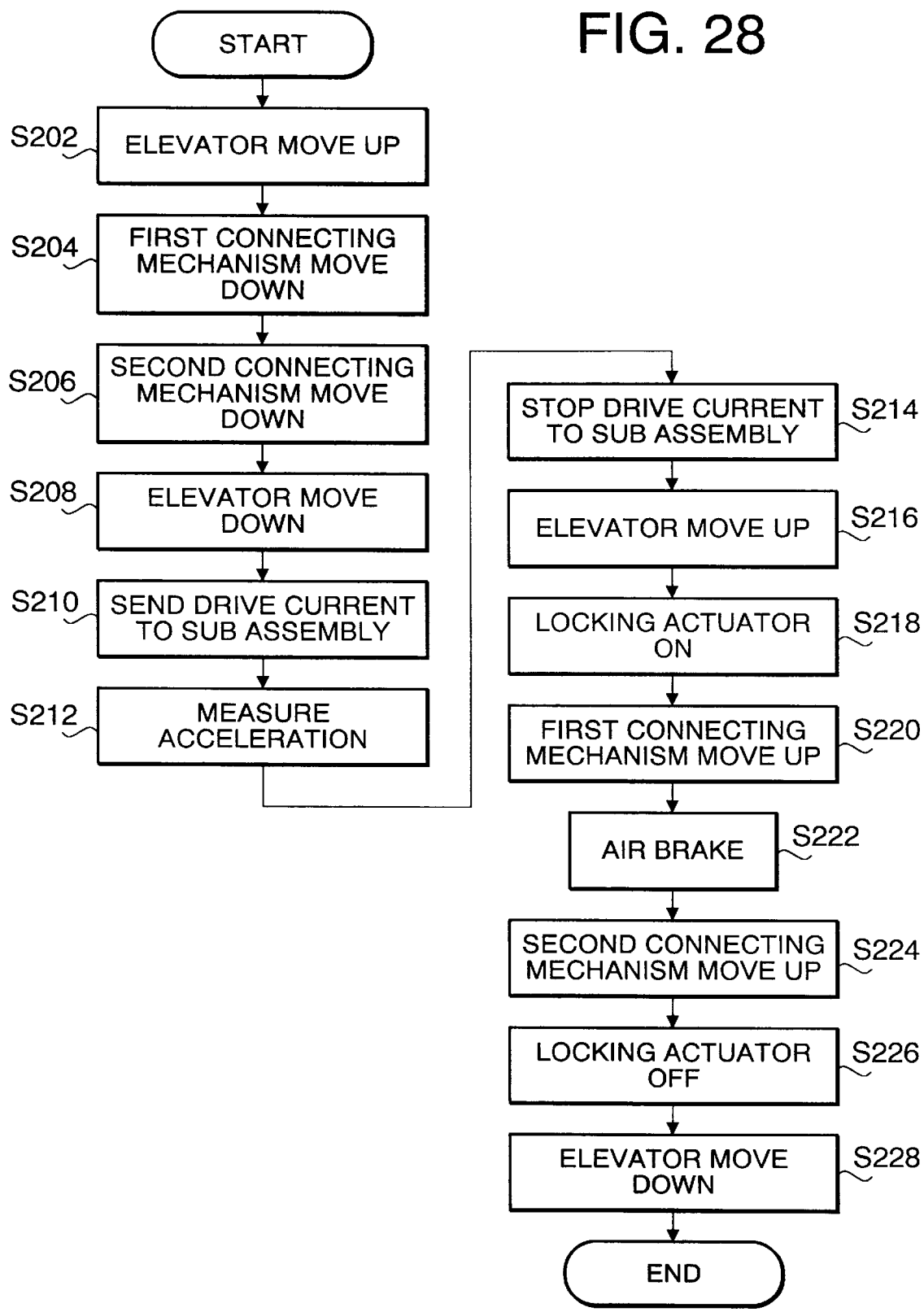
FIG. 28 is a flow chart showing a process at a measuring station.

FIG. 28 is a flow chart showing the process at the measuring station ST2. First, the elevator mechanism 6 lifts the holder 5 (step S202). The first connecting mechanism 9a then moves the plug unit 903 into the receptacle 207 (step S204), connecting the acceleration sensors 507 and 508 to the control unit CU. Further, the second connecting mechanism 9b moves the chuck 916 to put the connector block 918 on the polygon mirror sub-assembly 4 (step S206), connecting the polygon mirror sub-assembly 4 and the control unit. After these connections are completed, the elevator mechanism 6 moves down, and the holder 5 is left resiliently supported on the turntable 2 (step S208).

The control unit CU then sends the drive current to rotate the polygon mirror 406 of the polygon mirror sub-assembly 4 (step S210). The control unit senses the rotation speed of the polygon mirror 406 using the photo-sensor 510. When the rotation speed of the polygon mirror 406 has stabilized, the acceleration sensors 507 and 508 respectively detect vertical and horizontal acceleration and send the data to the control unit CU via the receptacle 207 and the plug unit 903 (step S212). According to the measured acceleration, the control unit CU calculates the dynamic balance of the polygon mirror 406 to determine the amount and position of the balance-weight agent to be applied on the polygon mirror 406 and the rotor 405.

After the measurement is completed, the control unit CU stops the drive current to the polygon mirror sub-assembly 4 (step S214). The elevator mechanism 6 then lifts the holder 5 (step S216). The lock actuator 7 actuates the lock pin 211 to engage with the lock hole 512 of the holder 5 (step S218). The first connecting mechanism 9a retract the plug unit 903 away from the receptacle 207 (step S220) The air brake system 10 is then activated to blow on the polygon mirror 406 to stop the rotation of the polygon mirror 406 (step S222). The second connecting mechanism 9b moves down, the chuck 916 grips the connector block 918, and pulls the connector block 918 away from the receptacle 413 of the polygon mirror sub-assembly 4 (step S224) and the holder 5 is prevented from being pulled upward because of the engagement of the lock pin 211 and the lock hole 512. The lock actuator 7 then releases the lock pin 211 and the elevator mechanism 6 moves down to leave the holder 5 resiliently supported on the turntable 2 (steps S226 and S228).

Figure 29:
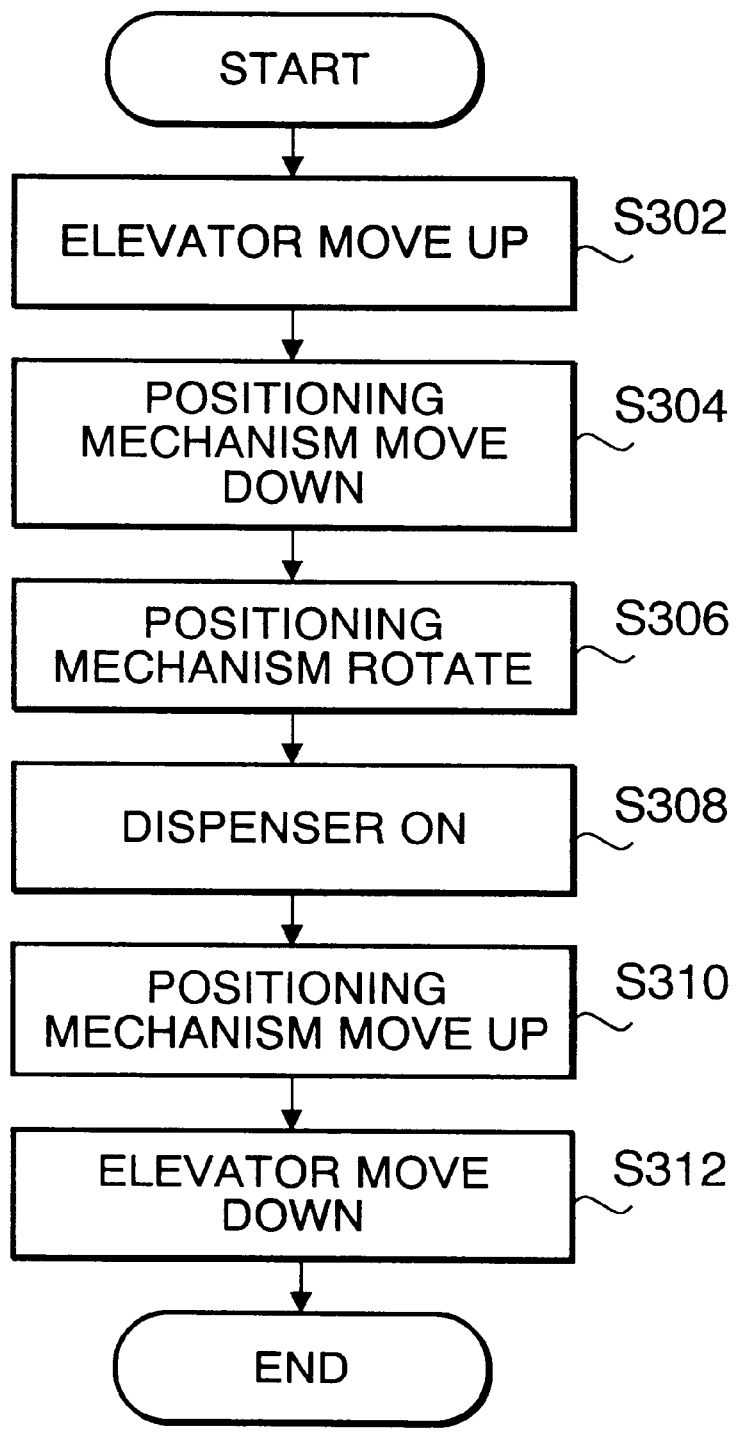
FIG. 29 is a flow chart showing a process at a dispenser station.

FIG. 29 is a flow chart showing the process at the dispenser station ST3. First, the elevator mechanism 6 lifts the holder 5 (step S302). Then, the positioning mechanism 12 moves downward such that the contact rolling member 1211 contacts the polygon mirror 406, and the connector pins 1216 contact the receptacle 207 on the turntable 2 (step S304). Then, by using the output of the photo sensor 510 through the connector pins 1216, the control unit CU rotates the contact rolling member 1211 to rotate the polygon mirror 406 to a calculated position (step S306). The dispenser 11 is then driven to dispense the balance-weight agent onto an upper surface of the polygon mirror 406 (step S306). After dispensing is completed, the positioning mechanism 12 moves the contact rolling member 1211 and the connector pins 1216 up (step S310), and the elevator mechanism 6 moves down to leave the holder 5 resiliently supported on the turntable 2 (step S312).

Figure 30:
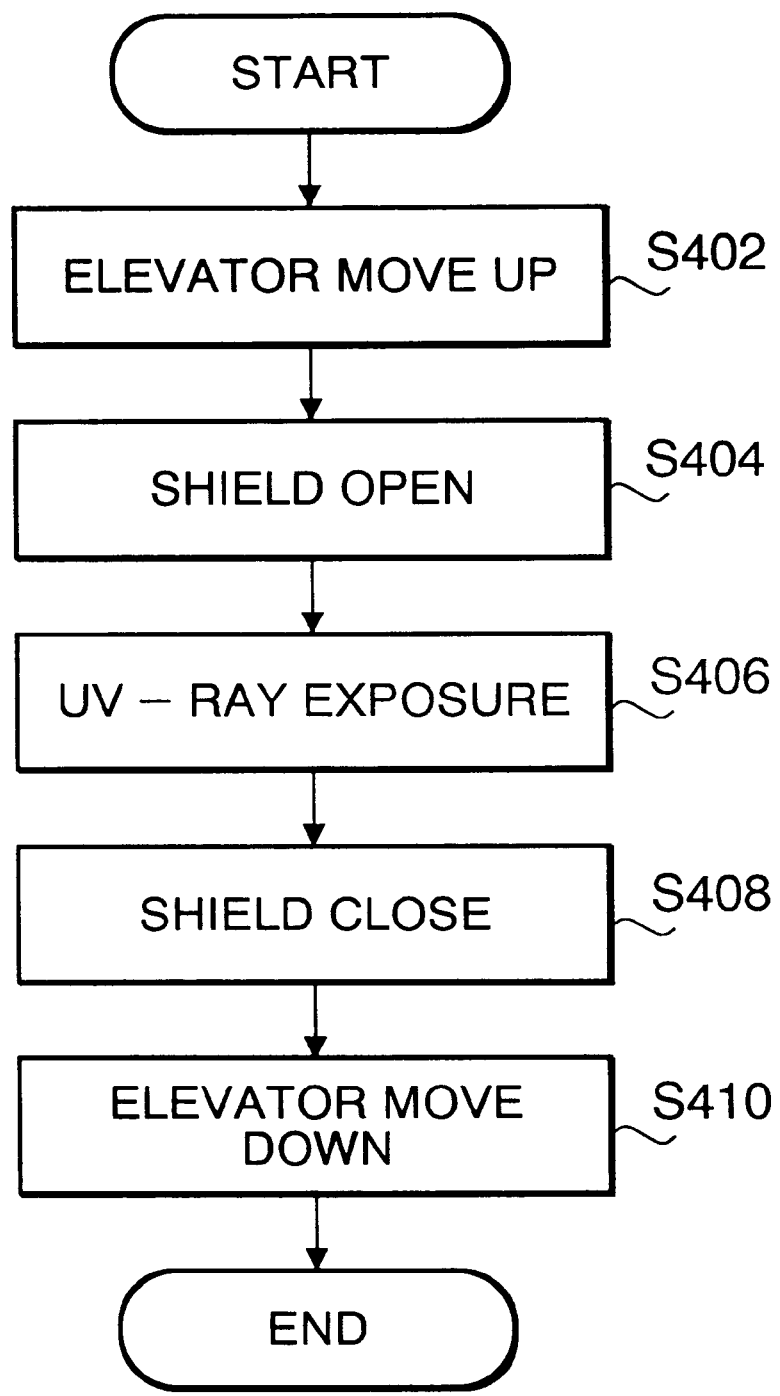
FIG. 30 is a flow chart showing a process at a fixing station.

FIG. 30 is a flow chart showing the process at the fixing station ST4. First, the elevator mechanism 6 lifts the holder 5 (step S402). Then, the shield 1304 of the fixing unit 13 moves to open the optical fiber 1302 (step S404) and UV light emitted from the UV lamp 1301 radiate the polygon mirror 406 to expose and harden (cure) the applied balance-weight agent (step S406). After the UV light exposure, the shield 1304 moves to cover the optical fiber 1302 (step S408). The elevator mechanism 6 then moves down to leave the holder 5 resiliently supported on the turntable 2 (step S410).

At the second dispenser station ST5, the dispenser 11 dispenses the balance-weight agent on the rotor 405 rather than on the polygon mirror 406. However, since the process at the second dispenser station ST5 and the second fixing station ST6 are essentially the same as those of FIGS. 29 and 30, the description is omitted.

Figure 31:
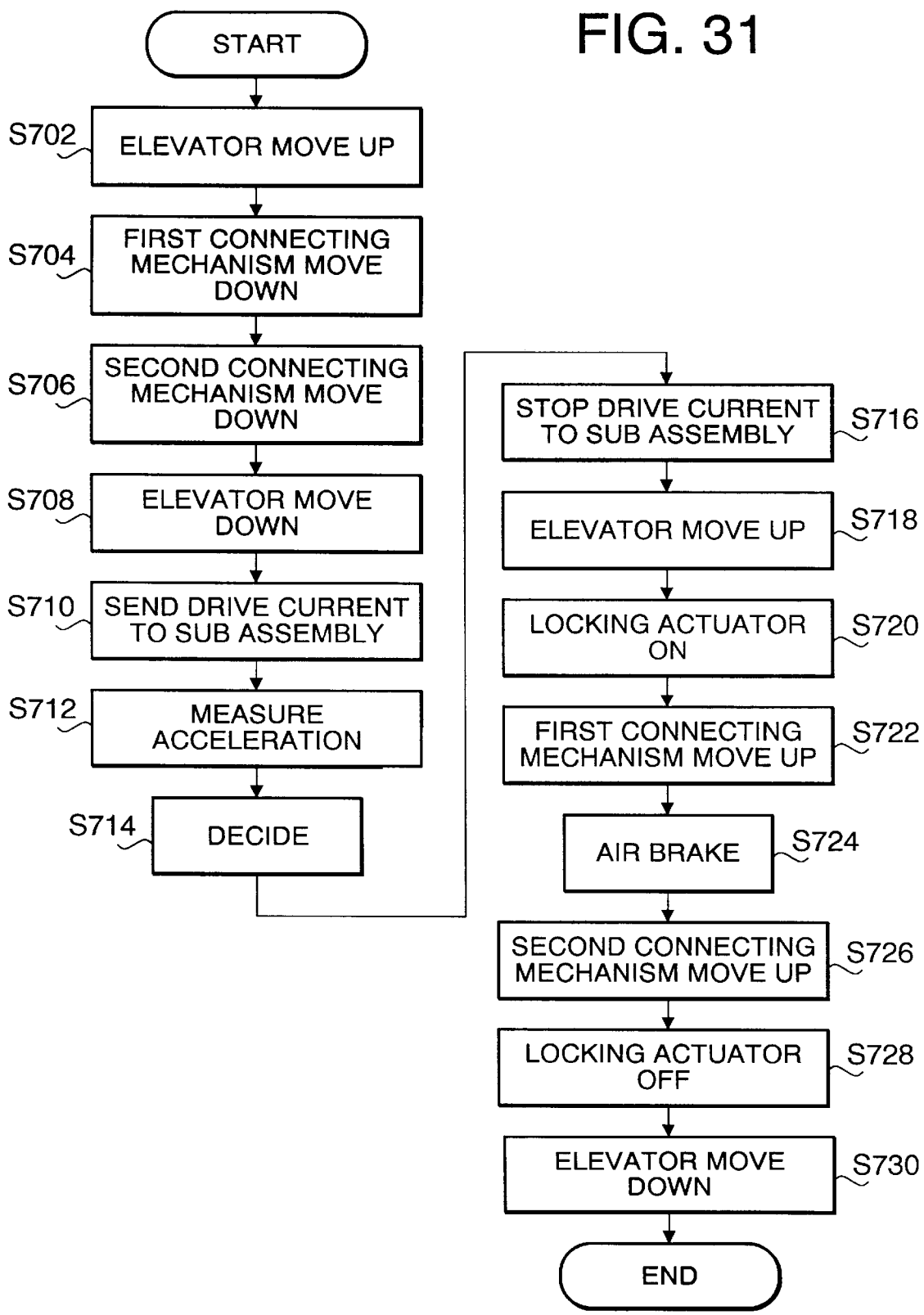
FIG. 31 is a flow chart showing a process at a checking station.

FIG. 31 is a flow chart showing the process at the checking station ST7. The process at the checking station ST7 and the process at the measuring station ST2 (FIG. 28) are the same excepting one step. That is, the process at the checking station ST7 further includes a decision step S714 in which the control unit CU determines whether the result of the adjustment is sufficient or not. Otherwise steps S702 to S712 and S716 to S730 of FIG. 31 correspond to similarly named steps S202 to S228 of FIG. 28.

In this embodiment, the decision step (step S714) is placed between the measurement of the acceleration (step S712) and the stopping of the drive current (step S716). In the decision step (step S714), the measured acceleration is compared with a predetermined threshold. If the measured acceleration is larger than the threshold, the control unit CU decides to continue the adjustment. If the measured acceleration is not larger than the threshold, the control unit CU decides to discharge the adjusted polygon mirror sub-assembly 4 at the discharge station ST8.

Figure 32:
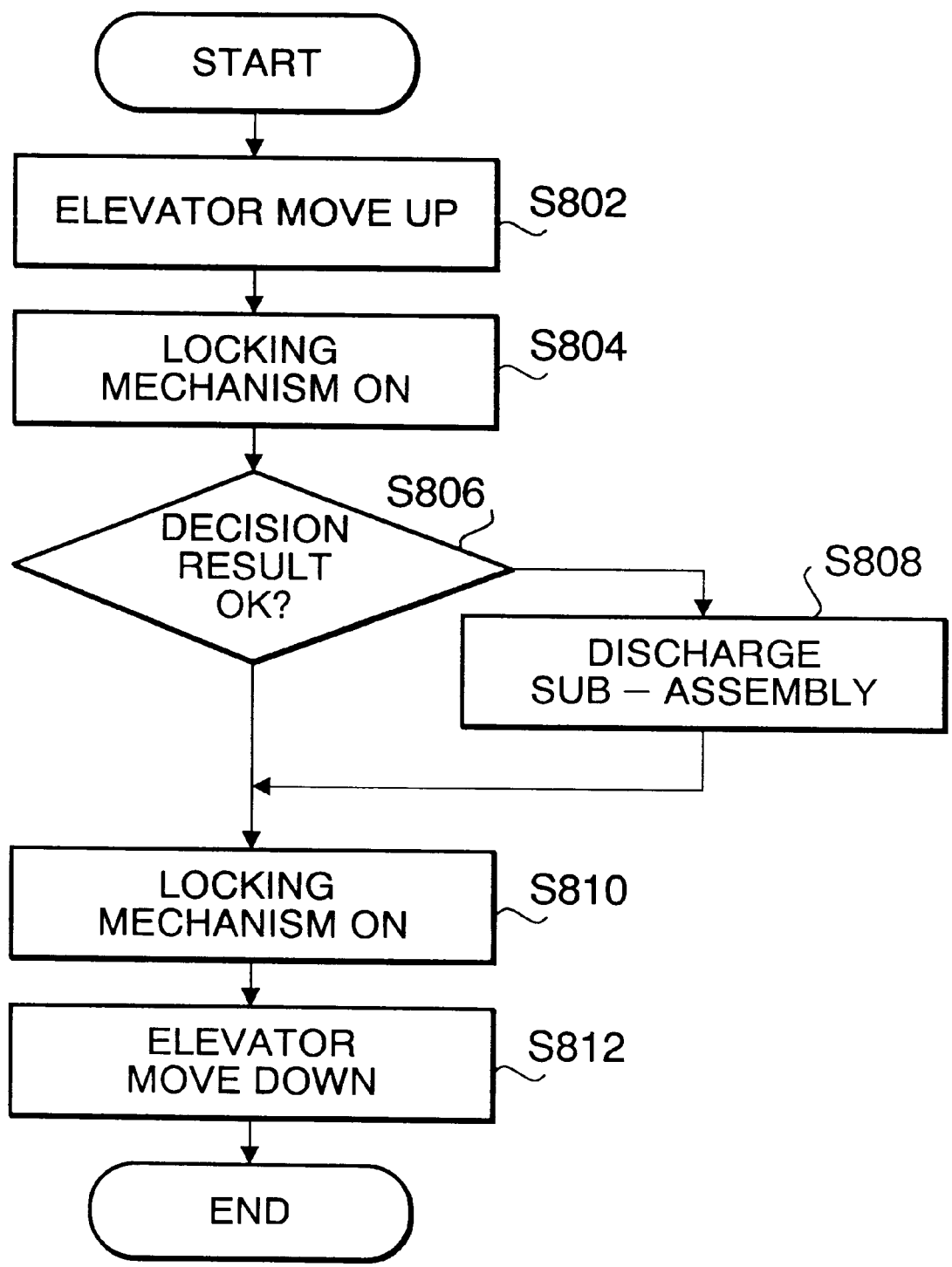
FIG. 32 is a flow chart showing the process at a discharge station.

FIG. 32 is a flow chart showing the process at the discharge station ST8. First, the elevator mechanism 6 lifts up the holder 5 and the lock mechanism 7 locks the holder 5 (steps S802 and S804). If the control unit CU has decided to discharge the polygon mirror sub-assembly 4 (at the step S714 of FIG. 31), the robot 801 picks up the polygon mirror sub-assembly 4 from the holder 5 and carries it to the slide carrier 803. If the control unit CU has decided to continue the adjusting, the robot 801 does not discharge the polygon mirror sub-assembly 4, and thus, the polygon mirror sub-assembly 4 is again carried through the stations ST1 through ST8 for further adjustment.

As constructed above, the balancing operation of the polygon mirror sub-assembly 4 can be automatically performed precisely and at high speed.

Further, since the polygon mirror sub-assembly 4 is mounted on the holder 5 and the holder 5 is supported by the resilient members 203, it is possible to detect the dynamic balance of the polygon mirror 406, using the acceleration sensors 507, 508 mounted on the holder 5. Since each holder is provided with the acceleration sensors 507, 508, the detection of vibration is performed simply by connecting the control unit CU and the acceleration sensors 507, 508.

Furthermore, since the polygon mirror 406 is rotated by the polygon mirror sub-assembly 4 itself by connecting the control unit CU and the polygon mirror sub-assembly 4, it is possible to measure the dynamic balance of the polygon mirror 406 while the polygon mirror 406 is already mounted to the polygon mirror sub-assembly 4.

Although the structure and operation of a dynamic balance adjusting apparatus is described herein with respect to the preferred embodiments, many modifications and changes can be made without departing from the spirit and scope of the invention.

The present disclosure relates to subject matter contained in Japanese Patent Application Nos. HEI 08-126943, filed on May 22, 1996, HEI 08-127073, filed on May 22, 1996, HEI 08-132928, filed on May 28, 1996, HEI 08-132942, filed on May 28, 1996, HEI 08-132983, filed on May 28, 1996, which are expressly incorporated herein by reference in their entirety.

What is claimed is:

1. A dynamic balance adjusting apparatus for adjusting a dynamic balance of a rotating body on a workpiece, said apparatus comprising:
   a control unit;
   a turntable for carrying a workpiece thereon, said turntable controlled by said control unit to move along a predetermined path;
   a plurality of stations arranged along said predetermined path and controlled by said control unit, said plurality of stations comprising:
      a mounting station for mounting said workpiece on said turntable;
      a measuring station for measuring a dynamic balance of said rotating body;
      an applying station for applying at least one balance-weight on said rotating body according to the measurement of said measuring station; and
      a discharge station for discharging said workpiece from said turntable.

2. The dynamic balance adjusting apparatus according to claim 1, said turntable provided with a plurality of holders, arranged along said predetermined path, each holder holding one workpiece thereon.

3. The dynamic balance adjusting apparatus according to claim 2, wherein said measuring station measures said dynamic balance of said rotating body by measuring horizontal and vertical acceleration of said holder.

4. The dynamic balance adjusting apparatus according to claim 3, each of said plurality of holders being provided with at least one acceleration sensor for measuring a vibration caused by a rotation of said rotating body.

5. The dynamic balance adjusting apparatus according to claim 4, each of said plurality of holders further comprising a receptacle electrically connected to said at least one acceleration sensor.

6. The dynamic balance adjusting apparatus according to claim 5, said measuring station comprising a connecting mechanism which is connectable to said receptacle such that said measuring station is electrically connected to said acceleration sensor when said holder is positioned at said measuring station.

7. The dynamic balance adjusting apparatus according to claim 6, said connecting mechanism comprising a plug and a plug carrier for plugging said plug into said receptacle.

8. The dynamic balance adjusting apparatus according to claim 4, said at least one acceleration sensor comprising two acceleration sensors for measuring vibrations in different directions caused by a rotation of said rotating body.

9. The dynamic balance adjusting apparatus according to claim 4, said turntable provided with resilient support members which support said plurality of holders.

10. The dynamic balance adjusting apparatus according to claim 9, wherein each of said plurality of holders is square-shaped and said resilient support members are constructed to support corners of each of said plurality of holders.

11. The dynamic balance adjusting apparatus according to claim 1, wherein said applying station is so arranged to apply said at least one balance-weight onto two positions of said rotating body.

12. The dynamic balance adjusting apparatus according to claim 11, wherein said applying station includes first and second applying stations which respectively apply said at least one balance-weight onto different positions of said rotation body.

13. The dynamic balance adjusting apparatus according to claim 2, at least one of said plurality of stations provided with an elevator mechanism for supporting said holder at a predetermined position in relation to said turntable.

14. The dynamic balance adjusting apparatus according to claim 13, said elevator mechanism comprising at least one holding member, at least one positioning member and an actuator for moving said holding and positioning members toward said holder until said holding member abuts said holder to support said holder thereon and said positioning member engages a portion of said holder to determine the position of said holder.

15. The dynamic balance adjusting apparatus according to claim 14, wherein said elevator mechanism is provided at an opposite side of said turntable with respect to said holder, said turntable formed with through-holes through which the said holding member and said positioning member pass.

16. The dynamic balance adjusting apparatus according to claim 2, wherein said turntable includes a plurality of table units respectively corresponding to said plurality of stations and a center portion rotatably provided for supporting said plurality of table units.

17. The dynamic balance adjusting apparatus according to claim 1, further comprising a checking station for measuring a dynamic balance of said rotating body on which said balance-weight has been applied, and for checking whether the adjustment performed at said applying station is acceptable.

18. The dynamic balance adjusting apparatus according to claim 1, said mounting station including a robot to grip and carry said workpiece.

19. The dynamic balance adjusting apparatus according to claim 18, wherein said discharge station includes said robot of said mounting station.

20. The dynamic balance adjusting apparatus according to claim 2, each of said plurality of holders further comprising a magnetic arrangement for attaching said workpiece on said holder.

21. The dynamic balance adjusting apparatus according to claim 20, wherein said workpiece is a polygon mirror sub-assembly which includes a rotation shaft and a polygon mirror provided to a first end of said rotation shaft, a second end of said rotation shaft forming a protruding portion protruding from said polygon mirror sub-assembly, and wherein said holder is provided with a concave opening into which said protruding portion is inserted.

22. The dynamic balance adjusting apparatus according to claim 21, said magnetic arrangement comprising a conductive material provided to said rotation shaft of said polygon mirror sub-assembly and a magnet provided to the bottom of said concave opening for attracting said conductive member of said polygon mirror sub-assembly.

23. The dynamic balance adjusting apparatus according to claim 22, at least one of said plurality of stations further comprising a locking mechanism that locks said holder in a predetermined position relative to said table unit.

24. The dynamic balance adjusting apparatus according to claim 23, said locking mechanism comprising a receiving member provided on said holder and an engaging member provided to said turntable, said engaging member engaging said receiving member thereby to lock said holder.

25. The dynamic balance adjusting apparatus according to claim 24, further comprising a stationary base and said locking mechanism further comprising a locking actuator provided to said base for actuating said engaging member.

26. The dynamic balance adjusting apparatus according to claim 25, at least one of said plurality of stations further comprising an elevator mechanism for supporting said holder in a predetermined relationship to said turntable, and wherein said engaging member is positioned so that said engaging member engages said receiving member when said holder is lifted by said elevator mechanism.

27. The dynamic balance adjusting apparatus according to claim 20, said holder further comprising at least one acceleration sensor for detecting a vibration of said holder and at least one rotation sensor for detecting a rotational speed and rotational position of said polygon mirror.

28. The dynamic balance adjusting apparatus according to claim 1, said applying station comprising a positioning mechanism for positioning said rotating body with respect to said applying station.

29. The dynamic balance adjusting apparatus according to claim 28, said applying station further comprising a dispenser for dispensing a balance-weight agent on said rotating body.

30. The dynamic balance adjusting apparatus according to claim 29, said applying station further comprising a fixing device for hardening said dispensed balance-weight agent to fix said balance-weight agent onto said rotating body.

31. The dynamic balance adjusting apparatus according to claim 28, wherein said positioning mechanism includes a contact rolling member and a driving mechanism which moves said contact rolling member toward said rotating body and rotates said contact rolling member to thereby rotate said rotating body.

32. The dynamic balance adjusting apparatus according to claim 31, said driving mechanism including a stepping motor for rotating said contact rolling member.

33. The dynamic balance adjusting apparatus according to claim 32, said contact rolling member including a contact surface which contacts said rotating body, said contact surface being made of an elastic material.

34. The dynamic balance adjusting apparatus according to claim 29, wherein said workpiece is a polygon mirror sub-assembly and said rotating body includes a polygon mirror and a rotor for rotating said polygon mirror, and wherein said dispenser is so arranged to dispense said balance-weight agent onto at least one of said polygon mirror and said motor.

35. The dynamic balance adjusting apparatus according to claim 30, wherein said balance-weight agent is an ultraviolet curing agent and said fixing device is arranged to emit ultraviolet light to said balance-weight agent thereby to harden said balance-weight agent.

36. The dynamic balance adjusting apparatus according to claim 2, each of said plurality of holders provided with at least one acceleration sensor for detecting a vibration of said holder, and said measuring station comprising a connecting mechanism which connects said control unit and said acceleration sensor when said holder is located at said measuring station.

37. The dynamic balance adjusting apparatus according to claim 36, said turntable provided with a plurality of receptacles, each receptacle flexibly connected to said acceleration sensor of each holder.

38. The dynamic balance adjusting apparatus according to claim 36, said connecting mechanism comprising a plug unit including at least one contact pin connected to said control unit.

39. The dynamic balance adjusting apparatus according to claim 38, said connecting mechanism further comprising a plug carrier which moves said plug unit to said receptacle so that said plug unit is plugged into said receptacle.

40. The dynamic balance adjusting apparatus according to claim 39, said at least one contact pin comprising a plurality of contact pins and said receptacle comprising a plurality of terminals for receiving said contact pins respectively.

41. The dynamic balance adjusting apparatus according to claim 40, wherein said plurality of contact pins include at least one extendible pin, said extendible pin including coaxial outer and inner pins, said inner pin being axially movable along said outer pin so that said inner pin protrudes from said outer pin.

42. The dynamic balance adjusting apparatus according to claim 41, wherein said plurality of terminals include at least one terminal including two coaxial elements respectively for receiving said outer and inner pins.

43. The dynamic balance adjusting apparatus according to claim 36, each of said holders further provided with a rotation sensor for detecting the rotational speed and rotational position of said rotating body, and said control unit and said rotation sensor are connected by said connecting mechanism.

44. The dynamic balance adjusting apparatus according to claim 43, wherein said rotation sensor is arranged to detect a mark formed on said polygon mirror sub-assembly.

45. The dynamic balance adjusting apparatus according to claim 2, said measuring station comprising a connecting mechanism for connecting said control unit and a receptacle formed on said workpiece so that said control unit is able to drive said workpiece.

46. The dynamic balance adjusting apparatus according to claim 45, wherein said connecting mechanism comprises a connector unit electrically connected to said control unit and a manipulator which holds said connector unit, said manipulator being arranged to mount said connector unit on said receptacle of said workpiece and to retract said connector unit from said receptacle.

47. The dynamic balance adjusting apparatus according to claim 46, wherein said holder is provided with a mounting portion, and said connector unit abuts said mounting portion so that said connector unit engages said receptacle of said workpiece.

48. The dynamic balance adjusting apparatus according to claim 47, wherein said mounting portion has a magnet and said pin housing has a conductive member.

49. The dynamic balance adjusting apparatus according to claim 48, wherein said workpiece is a polygon mirror sub-assembly and said rotating body includes a polygon mirror, and wherein said control unit sends a signal to said polygon mirror sub-assembly to rotate said polygon mirror to detect the dynamic balance of said polygon mirror.

50. A dynamic balance adjusting apparatus for adjusting a dynamic balance of a rotating body of a workpiece, said apparatus comprising:
 a control unit;
 a turntable for carrying a workpiece thereon, controlled by said control unit, said turntable turning through a predetermined a rotation path;
 a plurality of stations, controlled by said control unit, arranged along said rotation path, said plurality of stations comprising:
  a mounting station for mounting said workpiece on said turntable;
  a measuring station for measuring a dynamic balance of said rotating body;
  a first dispenser station for applying a balance-weight agent on a position of said rotating body;
  a first fixing station for hardening said applied balance-weight agent on said rotating body;
  a second dispenser station for applying a balance-weight agent on another position of said rotating body;
  a second fixing station for hardening said applied balance-weight agent on said rotating body;
  an inspecting station for measuring a dynamic balance of said rotating body with said balance-weight agent applied; and
  a discharge station for discharging said workpiece from said turntable.

51. The dynamic balance adjusting apparatus according to claim 50, said turntable being provided with a plurality of holders arranged on said rotation path, each holder being able to hold one workpiece thereon.

52. The dynamic balance adjusting apparatus according to claim 51, each holder being provided with at least one acceleration sensor for measuring a vibration caused by a rotation of said rotating body,
 wherein said measuring station and said inspecting station are connected to said at least one acceleration sensor when said holder is positioned at said measuring station and said inspecting station.

53. The dynamic balance adjusting apparatus according to claim 52, each holder further comprising a receptacle electrically connected to said at least one acceleration sensor.

54. The dynamic balance adjusting apparatus according to claim 53, said measuring station further comprising a connecting mechanism having a movable plug and a plug carrier for moving said plug so that said plug is plugged into said receptacle.

55. A process for adjusting a dynamic balance of a rotating body on a workpiece, using a turntable for carrying a workpiece, said process comprising the steps of:
 mounting said workpiece on said turntable;
 measuring a dynamic balance of said rotating body;
 applying a balance-weight on said rotating body according to said measurement; and
 discharging said workpiece from said turntable.

56. A process for adjusting a dynamic balance of a rotating body on a workpiece, using a turntable for carrying a workpiece, said process comprising the steps of:
 mounting said workpiece on said turntable;
 measuring a dynamic balance of said rotating body;
 applying a balance-weight on a position of said rotating body;
 applying a balance-weight on another position of said rotating body;
 measuring a dynamic balance of said rotating body with said balance-weight agent applied; and
 discharging said workpiece from said turntable.

57. A process for adjusting a dynamic balance of a rotating body on a workpiece, using a turntable for carrying a workpiece, said process comprising the steps of:
 mounting said workpiece on said turntable;
 measuring a dynamic balance of said rotating body;
 dispensing a balance-weight agent on a position of said rotating body;
 hardening said balance-weight agent dispensed on said position of said rotating body;
 dispensing a balance-weight agent on another position of said rotating body;
 hardening said balance-weight agent dispensed on said another position of on said rotating body;
 measuring a dynamic balance of said rotating body with said balance-weight agent applied; and
 discharging said workpiece from said turntable.

\* \* \* \* \*